United States Patent Office 2,858,168
Patented Oct. 28, 1958

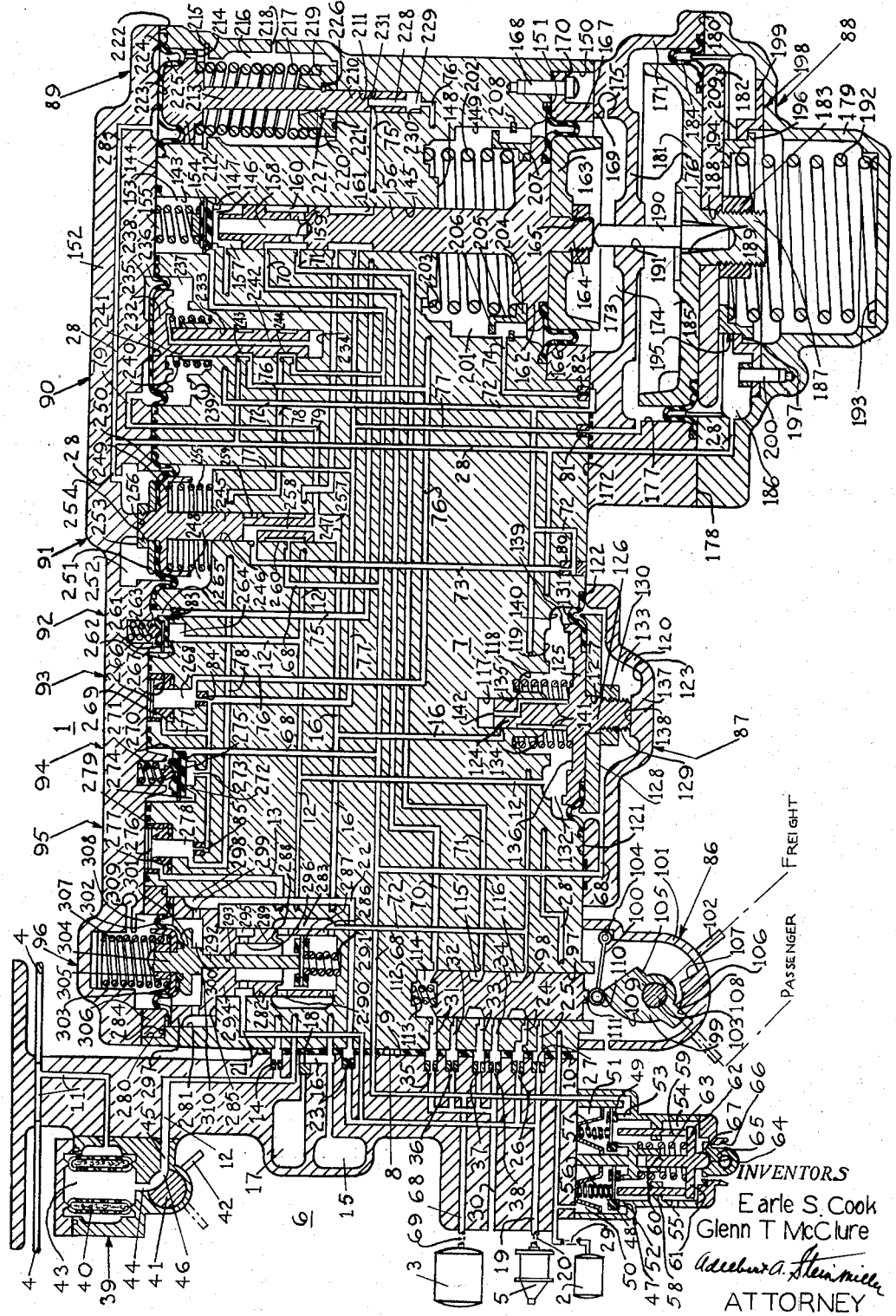

2,858,168
FLUID PRESSURE BRAKE APPARATUS

Earle S. Cook, Forest Hills, and Glenn T. McClure, McKeesport, Pa., assignors to Westinghouse Air Brake Company, Wilmerding, Pa., a corporation of Pennsylvania Application September 30, 1954, Serial No. 459,368

10 Claims. (Cl. 303—35)

This invention relates to fluid pressure brake apparatus particularly adapted for use on trains in European service, in which fluid under pressure from a supply reservoir is employed to apply the brakes and the degree of brake application is controlled according to variations in pressure of fluid in a brake pipe relative to a datum pressure in a control reservoir.

In previous fluid pressure brake apparatuses of the type identified above, it has been the practice in certain of such apparatuses, during full release of the brakes responsive to an increase in brake pipe pressure on a particular railway car, to first substantially fully recharge the supply reservoir with fluid under pressure from the brake pipe to within a certain extent less than brake pipe pressure via a relatively unrestricted one-way-flow communication, while the control reservoir is maintained closed off from supply reservoir and brake pipe, and subsequently upon reduction in brake cylinder pressure to a certain value, to connect, by establishment of restricted two-way-flow charging and overcharging dissipating communications, both the supply and control reservoirs to the brake pipe for make-up in any pressure deficiencies which may exist in these reservoirs.

It has been found that there is very little leakage of fluid under pressure from the control reservoir after same has been initially fully charged and closed off to the brake pipe so that its pressure tends to remain constant for a considerable length of time, whereas, the effecting of repeated alternate applications and releases of the brakes on the car in grade cycling, for example, by the apparatus could result in repeated cumulative losses in fluid under pressure from the control reservoir to the brake pipe upon repeated connection of said reservoir to the brake pipe during each successive momentary release, with consequent reduction in control reservoir pressure to the possible extent of improper control of the brakes, while, at the same time, it was also found that the slight deficiency in supply reservoir pressure at termination of supply thereto via the one-way-flow communication need not necessarily be made up during such cycling operation of the brakes.

In view of the possibility of such undesirable loss in control reservoir pressure during cycling operation as set forth in the preceding paragraph, it is an object of the present invention to provide a fluid pressure brake apparatus of the type in discussion which will be free of such possibility, and this object is attained, according to one feature of the invention, by provision of means which enables a full release of the brakes, responsively to increase in brake pipe pressure, without establishment of the two-way-flow charging and overcharge dissipating communications between the brake pipe and the control and supply reservoirs and which means also enables these communications to be established when a full recharging of the supply reservoir and make-up of a possible pressure deficiency in the control reservoir resultant from leakage, for example, is desired.

It is a further object of the invention to provide a fluid pressure brake apparatus of the type in discussion which will enable successive variations in degree of brake application to the extent of full release of the brakes, to be effected without establishment of the two-way-flow charging and overcharge dissipating communications and without causing a quick service reduction in brake pipe pressure during such variations.

It is another object of the invention to provide an improved fluid pressure brake apparatus of the above-identified type which incorporates means for simultaneously effecting an automatic retardation of release of the brakes and of recharging of the supply reservoirs on cars adjacent to the locomotive at the front of a train whenever the release-inducing increase in brake pipe pressure on such cars exceeds a certain rate, thereby initially conserving use of brake pipe fluid at the front of the train for more prompt brake pipe pressure build-up on cars to the rear to attain a more uniform and rapid release of brakes on the cars throughout the length of the train.

It is still another object of the invention to provide an improved fluid pressure brake apparatus improved according to the object set forth in the preceding paragraph and further characterized in that the rate of recharging of the supply reservoirs on such cars adjacent to the locomotive is controlled according to the rate of release of the brakes thereon.

Other objects and advantages of the invention will become apparent from the following more detailed description of the invention taken in connection with the accompanying drawing in which the single figure is a schematic representation of the fluid pressure brake apparatus embodying the invention.

DESCRIPTION

Referring to the drawing, the brake apparatus embodying the invention comprises a brake controlling valve device 1 for use on a railway car to control charging of control and supply reservoirs 2 and 3, respectively, on such car from a brake pipe 4 adapted for extension from the locomotive throughout a train from car to car, and to control supply and release of auxiliary reservoir fluid under pressure to and from a brake cylinder device 5 for applying and releasing, respectively, brakes on said railway car responsively to variations in pressure of fluid in said brake pipe.

For effecting the charging and variations in pressure of fluid in the brake pipe 4, the usual engineer's brake valve device (not shown) on the locomotive of the train may be employed. Such engineer's brake valve device may be of the type operable by movement of a handle to a release position for charging the brake pipe with fluid under relatively high pressure (which may be one hundred and ten pounds per square inch) during initial charging of the equipment to effect a uniform, rapid, release of the brakes on the various brake-equipped cars throughout the train; to a running position for maintaining the brake pipe charged with fluid at a normal operating pressure (which may be seventy pounds per square inch) to effect and/or maintain release of the brakes on such cars; to a service position for causing any desired degree of service reduction in pressure in said brake pipe below normal operating pressure according to the length of time the handle is maintained in such position to effect a corresponding degree of brake application; to a lap position for bottling up fluid in said brake pipe at the desired pressure, and to an emergency position for venting fluid under pressure from the brake pipe to the atmosphere at a rapid rate to effect an emergency application of the brakes.

The brake controlling valve device 1 comprises a pipe bracket portion 6 and a main casing portion 7 on which said pipe bracket portion 6 is mounted and secured by a suitable means (not shown); the pipe bracket portion 6 and main casing portion 7 being provided with corresponding mounting surfaces 8 and 9, respectively, between which is clamped a sealing gasket 10, preferably of resilient material.

The pipe bracket portion 6 comprises: a brake pipe passageway 11 adapted for connection to oppositely extending sections of the brake pipe 4 on the particular car on which the subject brake apparatus is being employed; a brake pipe passageway 12 in constantly open communication with a corresponding brake pipe passageway 12 in the main casing portion 7, by way of a respective registering opening in the gasket 10, and in constantly open communication with a supply reservoir overcharge dissipation passageway 13 in said main casing portion by way of a respective opening in the gasket 10 and a supply reservoir overcharge dissipation choke 14 which is accessible and removable at the mounting surface 8 when separated from the gasket 10; a quick service volume chamber 15 which is employed when the subject brake apparatus is used in freight service; a quick service passageway 16 in constantly open communication with a corresponding quick service passageway 16 in the main casing portion 7 by way of a respective opening in the gasket 10; a quick service volume chamber 17 which may be opened, when the subject brake apparatus is employed on passenger cars, to the quick service passageway 16 in the pipe bracket portion 6 by removal of a plug 18 at the mounting surface 8; a brake cylinder passageway 19 having a branch adapted for fluid pressure connection with a brake cylinder pipe 20 in turn connected to the brake cylinder device 5, and having respective branches connected to and in constantly open unrestricted communication with a brake cylinder passageway 21 in the main casing portion 7 by way of a respective opening in the gasket 10, to a brake cylinder passageway 22 in the main casing portion 7 by way of an inshot baffle choke 23 removable via the mounting surface 8, and to brake cylinder passageways 24 and 25 in the main casing portion 7 by way of chokes 26 and 27, respectively, both of which are removable via the mounting surface 8; a control reservoir passageway 28 in constantly open communication with a corresponding control reservoir passageway 28 in the main casing portion 7 by way of a respective opening in the gasket 10 and adapted for fluid pressure connection with a control reservoir pipe 29 in turn connected to the control reservoir 2; and a fluid pressure exhaust passageway 30 in constantly open communication with fluid pressure exhaust passageways 31, 32, 33 and 34 in the main casing portion 7 by way of respective openings in the gasket 10 and chokes 35, 36, 37 and 38, respectively, which are mounted in the pipe bracket portion 6 and removable therefrom by way of a mounting surface 8.

The usual brake pipe cut-out valve device 39, mounted on the pipe bracket portion 6, including the usual air strainer 40 and cut-out cock 41 operably connected to a handle 42 is arranged to establish and disestablish communication between the brake pipe passageways 11 and 12 in said pipe bracket portion; said brake pipe cut-out valve device having a chamber 43 in constantly open communication with said brake pipe passageway 11 and in which chamber the strainer 40 is disposed, an inlet port 44 open to the cut-out cock 41 and in constantly open communication with said chamber 43, and an outlet port 45 in constantly open communication with the brake pipe passageway 12 in said pipe bracket portion. A passageway 46 is provided the cut-out cock 41 for registry with the ports 44 and 45 according to position of the cut-out cock handle 42.

In addition, a control and supply reservoir release valve device 47 is mounted on the pipe bracket portion 6 and such device 47 comprises a pair of poppet type valves 48 and 49 disposed in control and supply reservoir pressure chambers 50 and 51, respectively, and cooperative with valve seats 52 and 53, respectively, to control communication between said chambers 50 and 51, and a non-pressure chamber 54 which is constantly open to the atmosphere by way of a port 55 in the casing of said device 47.

The valves 48 and 49 are biased toward their respective seated positions in engagement with seats 52 and 53, respectively, by light compression springs 56 and 57, respectively. Actuating stems 58 and 59 slidably guided within the non-pressure chamber 54 are provided the device 47 for unseating engagement with the valves 48 and 49, respectively, against opposition of the springs 56 and 57.

A slidably-guided member 60 having oppositely extending arms 61 and 62 for abutment with the stems 58 and 59, respectively, is provided to act as an agent through which said stems may be advanced into unseating engagement with the valves 48 and 49, respectively. The member 60 is urged by a bias spring 63 in the non-pressure chamber 54 into abutment at a ball and socket joint 64 with one end of an operator's lever 65 which extends through an opening 66 to the exterior of the casing of the device 47.

In encirclement of the ball and socket joint 64 the operator's lever 65 is provided with a radially extending flange 67 which is urged into solid abutment with an annular shoulder in encirclement of the opening 66 by the spring 63 through the medium of member 60 to define a repose position of the components of the assemblage in which they are shown in the drawing.

In operation of the control and supply reservoir release valve device 47, the valves 48 and 49 therein can be unseated to open chambers 50 and 51, respectively, to the non-pressure chamber 54 by rocking movement of the operator's lever 65 to thereby cause its flange 67 to tilt about a contact pivot point for advancement of the member 60 through the ball and socket joint 64 in the direction of said valve and thereby cause unseating engagement of the stems 58 and 59 therewith. The stem 58 is longer than the stem 59, so that, during such rocking movement of the operator lever 65 and advancement of member 60, the valve 48 will be unseated before the valve 49, thereby making it possible to unseat either the valve 48 or the valve 48 and the valve 49 according to the degree of rocking movement of the lever 65.

In the control and supply reservoir release valve device 47 its control reservoir pressure chamber 50 is in constantly open communication with the control reservoir passageway 28 in the pipe bracket portion 6, and the supply reservoir pressure chamber 51 is in constantly open communication with a supply reservoir passageway 68 in said pipe bracket portion 6, which supply reservoir passageway is, in turn, in constantly open communication with the supply reservoir 3 by way of a pipe 69 connected to said passageway, and is also constantly open to a corresponding supply reservoir passageway 68 in the main casing portion 7 by way of a respective opening in the gasket 10.

Formed in the main casing portion 7, in addition to the passageways previously mentioned, are exhaust passageways 70 and 71, brake cylinder passageways 72, 73, and 74, a fast rate control reservoir supply passageway 75, passageways 76, 77 and 78, and a charging valve device control passageway 79.

Contained within the main casing portion 7 there is a quick service continuation regulating choke 80, a brake pipe pressure service valve device control stabilizing choke 81, a brake cylinder pressure service valve device control stabilizing choke 82, a control reservoir fast charge control choke 83, a control reservoir slow charge control choke 84, and a supply reservoir slow charge control choke 85.

Substantially contained within or otherwise directly associated with the main casing portion 7 are a service selector valve device 86, a quick service valve device 87, a service valve device 88, a charging cut-off valve device 89, a charging valve device 90, an interlock valve device 91, a control reservoir charging check valve device 92, a control reservoir overcharge check valve device 93, a supply reservoir charging check valve device 94, a supply reservoir overcharge check valve device 95, and a brake cylinder inshot valve device 96.

The service selector valve device 86 is provided with a counterbore 97 which extends inwardly of the main casing portion 7 and into the peripheral wall of which open radialwise the passageways 24, 25, 31, 32, 33, 34, 70, 71 and 72 in said casing portion 7.

A stem type slide valve 98, insertable and removable from the exterior of the main casing portion 7, is disposed in the cylindrical cavity formed in said main casing portion by the counterbore 97 and is in slidably guided cooperation at its outer periphery with the inner peripheral wall of said counterbore.

For selective movement of the slide valve 98 to either of two axial positions, "Freight" and "Passenger," and to define such positions, the service selector valve device 86 comprises a cam 99 and cam follower 100 which are disposed within a cap member 101 covering the open end of the counterbore 97, and which are operable through the medium of an operator's lever 102 extending exteriorly of said cap member.

The cam 99 is pivotally connected to the cap member 101 through the medium of a pin 103.

The follower member 100 is pivotally connected at its one end to the cap member 101 by a pin 104.

The operator's lever 102 is operatively connected to the cam 99 in a manner not shown in the drawing, but which may simply be by attachment with the pin 103.

The cam 99 is provided with circumferentially-spaced-apart shoulders 105 and 106 which extend in a generally radialwise direction outward from the pin 103 for abutment with accommodating shoulders 107 and 108 formed in the inner surface of the cap member 101 to define opposite limit positions for turning movement of the cam 99 about the axis of the pin 103. A cam surface 109 is formed on the cam 99 for engagement with a cam-engaging end 110 of the cam follower 100, which end in turn abuts a central raised portion 111 of the slide valve 98.

A light compression spring 112 is disposed between the end wall 113 of the counterbore 97 and the respective end of the slide valve 98 and disposed within a chamber 114 defined by such end wall, valve end and counterbore, to urge the slide valve 98 into abutment with the follower member 100 which in turn is urged into engagement with the cam 99.

When the operator's handle 102 is in the position in which it is shown in the drawing bearing the legend "Freight," the shoulder 106 of the cam 99 is in engagement with the shoulder 108 of the cap member 101 and the slide valve 98 is in a corresponding position in which it also is shown in the drawing. When the operator's handle or lever 102 is moved from its "Freight" position to an opposite position bearing the legend "Passenger," the cam 99 is rocked to a position defined by engagement of the shoulder 105 with the shoulder 107 in the cap member 101, and, due to the contour of the cam surface 109, engaged by follower member 100, the spring 112 is permitted to move the slide valve 98 to a corresponding "Passenger" position.

The length of the slide valve 98 relative to the length of the counterbore 97 is such that the chamber 114 is constantly open to the passageways 31 and 70, but in addition becomes open to the passageway 32 when the slide valve 98 assumes its position corresponding to "Passenger" position of the operator's lever 102.

An annular groove 115 is formed in the outer periphery of the slide valve 98. The groove 115 is so proportioned that it remains in constantly open communication with the exhaust passageways 33 and 71 in both positions of the slide valve 98, but in addition becomes open also to the exhaust passageway 34 when the slide valve is caused to assume its position corresponding to "Passenger" position of the operator's lever 102.

A similar groove 116, formed in the outer periphery of the slide valve 98, is so proportioned as to be in constantly open communication with the brake cylinder passageways 24 and 72 in either position of said slide valve, but in addition becomes also open to the brake cylinder passageway 25 when said slide valve is caused to assume its position corresponding to "Passenger" position of the operator's lever 102.

Provided in the main casing portion 7 in accommodation for components of the quick service valve device 87 there is formed an irregular shaped circular cavity having a central counterbore 117 encircled by a cylindrical spring-accommodating cavity defined by a recessed surface 118, and a diaphragm follower and travel-fold accommodating portion defined by a surface 119.

A cap member 120, provided the quick service valve device 87, is adapted by virtue of a mounting surface 121 for pressure-tight abutting engagement with a similar mounting surface 122 on the casing portion 7; means (not shown) being provided for securing the cap member 120 to the main casing portion 7. The cap member 120 is provided with a circular cavity defined by a recessed surface 123 extending inwardly from the mounting surface 121. The cavity defined by the surface 123 is open to a supply reservoir passageway 68 formed in the cap member 120, which passageway is adapted for constantly open communication with the corresponding passageway 68 in the main casing portion 7 by way of registering openings in the mounting surfaces 121 and 122.

A stem type slide valve 124 is disposed in the portion of the cavity in the main casing portion 7 defined by the inner surface of the counterbore 117 and is in slidably guided cooperation at its outer peripheral surface with the cylindrical wall of said counterbore. The slide valve 124 extends from the counterbore 117 in the direction of the cap member 120 and is attached at its respective end to the central portion of a diaphragm follower member 125 extending radially outward therefrom.

The follower member 125 is provided with a central stud portion 126 which extends axially therefrom through a central opening 127 in a follower member 128 into the cavity formed within the cap member 120. The portion of the stud portion 126 extending beyond the follower member 128 is provided with screw threads 129 to accommodate a nut 130 secured thereon for clamping the diaphragm follower members 125 and 128 together.

The usual annular flexible diaphragm 131 of resilient material is clamped at its inner peripheral edge between the follower members 125 and 128 and at its outer peripheral edge between the cap member 120 and the main casing portion 7 to permit travel of the assemblage in an axial direction while preventing transfer of fluid under pressure from one side to the other.

The assemblage including the diaphragm follower members 125 and 128 and the diaphragm 131 separates the volume formed by the cavities in the main casing portion 7 and cap member 120 into a brake pipe pressure chamber 132 at one side and a supply reservoir pressure chamber 133 at its opposite side; the chamber 132 being in constantly open communication with the brake pipe passageway 12 in the main casing portion 7, and the supply reservoir pressure chamber 133 being in constantly open communication with the branch of the supply reservoir passageway 68 in the cap member 120.

A light compression spring 134 is disposed in the brake pipe pressure chamber 132 in encirclement of the slide valve 124 for urging the diaphragm assemblage in the direction of the supply reservoir pressure chamber 133. One end of the spring 134 abuts an annular shoulder 135 formed in casing portion 7, while the opposite end of said spring abuts a similar shoulder 136 formed in the diaphragm follower member 125.

A boss 137 is provided in the interior of the cap member 120 which has a stop surface 138 for engagement by the projecting end of the stud portion 126 of follower member 125 to define a repose position of the assemblage including valve 124, follower members 125 and 128, and diaphragm 131, in which position said assemblage is shown in the drawing, as urged thereto by the spring 134 and/or by virtue of a preponderance in pressure in the chamber 132 over that in the chamber 133.

Upon establishment of a slight preponderance in pressure of fluid in the supply reservoir pressure chamber 133 over that in the brake pipe pressure chamber 132, such as results from a slight reduction in brake pipe pressure during initiation of a brake application, to the extent of seven-tenths of a pound, for example, the assemblage including the slide valve 124, and diaphragm follower members 125 and 128, will move in the direction of the brake pipe pressure chamber 132 from the repose position in which it is shown in the drawing to an opposite quick service position defined by engagement of an annular shoulder 139 formed on diaphragm follower member 125 with a corresponding annular shoulder 140 formed in the casing portion 7.

A pair of axially-extending grooves 141 are formed in the outer periphery of the slide valve 124. The corresponding end of each of the grooves 141 is in constantly open communication with the brake pipe pressure chamber 132. The opposite end of one of the grooves 141 is in constantly open communication, by way of a passageway 142 in the slide valve 124, with the end of the counterbore 117 otherwise closed by the end of said valve 124. The corresponding end of the other groove 141 is so located relative to travel of the slide valve 124 and disposition of an end of a respective branch of the quick service passageway 16 in the casing portion 7 which opens into the wall of the counterbore 117, that said other groove 141 also becomes open to said respective branch of the passageway 16 when the slide valve 124 is in its position corresponding to the quick service position of the assemblage in which it is comprised, and otherwise out of registry with said passageway 16 when the slide valve 124 is in other than said quick service position. At such time, the end of said passageway 16 is blanked off by the slide valve 124 to the interior of the counterbore 117.

For accommodation of components of the service valve device 88, there is a bore 143 opening inwardly of the main casing portion 7 from an outer mounting surface 144 thereon into junction with a slightly smaller bore 145 by way of an opening 146 encircled by a valve seat 147 formed in said casing portion. The bore 145 opens coaxially into a cavity defined by an end wall 148 and cylindrical surface 149 formed in said casing portion 7 and which cavity opens to the mounting surface 122 of said casing portion by way of a coaxial counterbore 150; an annular radial shoulder 151 being formed in said casing portion at the inner end of said counterbore and entrance to said cylindrical surface 149.

A cap member 152 is mounted on the outer mounting surface 144 of the main casing portion 7 and has a portion which closes the end of the bore 143 which opens into said mounting surface to define an end wall of a brake cylinder supply chamber 153, the peripheral wall of which is defined by the wall of the bore 143 and the opposite end of which terminates at the valve seat 147 at the entrance to the opening 146.

The brake cylinder supply chamber 153 is in constantly open communication with a branch of the supply reservoir passageway 68.

A brake cylinder supply control valve 154 is disposed in the brake cylinder supply chamber 153 and is slidably guided at its outer periphery by the wall of the bore 143 for cooperation with the seat 147 to control communication between said chamber 153 and the opening 146. The valve 154 is biased in the direction of the seat 147 by a light compression spring 155 also disposed in the brake cylinder supply chamber 153 and interposed between the cap member 152 and said valve 154.

Disposed within the cavity in the casing portion 7 formed by the bore 145 there is a stem type slide valve 156 which is slidably guided at its outer periphery by the wall of said bore. One end of the slide valve 156 is reduced in cross section to permit such end to be inserted with clearance through the opening 146 into engagement with the valve 154. The outer surface of such reduced portion of the slide valve 156 defines the inner peripheral wall of an annular passageway 157, the outer peripheral wall of which is defined by the wall of the bore 145. Such annular passageway 157 is in constantly open communication with a branch of the brake cylinder passageway 72 which opens radialwise into or through the wall of the bore 145. A brake cylinder release passageway 158 opens axially inward from the reduced end of the slide valve 156 into constantly open communication at its opposite end, by way of radially-extending ports 159, with an annular groove 160 formed in the outer periphery of said slide valve; the annular groove 160 being provided for communication with ends of the exhaust passageways 70 and 71 which open into the wall of the bore 145, according to position of slide valve 156 which will be described herein subsequently. Formed in the outer periphery of the slide valve 156 there is also an annular groove 161 spaced apart from the groove 160 for registry with the brake pipe passageway 12 and the passageway 77 also according to axial position of the slide valve 156.

Disposed in the cavity formed in the main casing portion 7, the peripheral wall of which cavity is defined by the cylindrical surface 149 and counterbore 150, there is a follower member 162 which is integrally attached to a respective end of the slide valve 156 and removably attached to an annular diaphragm follower member 163 through the medium of a threaded stud portion 164 of member 162 and a nut 165.

An annular flexible diaphragm 166 of resilient material is provided the assemblage to prevent flow of fluid under pressure in an axial direction across the follower members 162 and 163 while permitting axial movement thereof. The flexible diaphragm 166 is clamped at its inner periphery between follower members 162 and 163 and at its outer periphery between the casing portion 7 and a retaining ring 167 which is fit into the counterbore 150 and held in seating engagement with the annular shoulder 151 by a plurality of machine screws 168, one of which is shown in the drawing.

The axial length of the retaining ring 167 is such that its one end surface 169 is flush with the mounting surface 122 of the casing portion 7 when said ring is held secured in place by the machine screws 168; a recessed flat surface 170 being provided in the retaining ring 167 disposed away axialwise from the end surface thereof which is coincident with the mounting surface 122 to provide space for disposition of the head of the machine screws 168.

The service valve device 88 further comprises a casing member 171 having a mounting surface 172 for abutment with the aligned end surface 169 of the retaining ring 167 and the mounting surface 122 of the main casing portion 7. Member 171 also has formed therein a cavity defined by a recessed surface 173 extending inwardly from the mounting surface 172 to define a non-pressure chamber 174 in cooperation with the inner periphery of the retaining ring 167 and the diaphragm assemblage including the diaphragm 166 and follower member 163, etc.; said non-pressure chamber 174 being in constantly open communication with the atmosphere by way of a vent port 175 formed in member 171. At the opposite side of a partition 176 formed in member 171 there is formed a circular cavity defined by recessed surface 177 extending axialwise into intersection with a radially-extending mounting surface 178.

A hollow cap member 179 having a mounting surface 180 for abutment with the corresponding surface 178 on the casing member 171 encloses the open end of the cavity formed by the recessed surface 177 in said member 171.

Within the space defined by the hollow cap member 179 and recessed surface 177 in the casing member 171 there is disposed a diaphragm assemblage including follower members 181 and 182, locked together by a nut 183, and a diaphragm 184 clamped at its inner periphery between said follower members and clamped at its outer periphery between said cap member and said casing member; said assemblage dividing the interior of said cavity into a brake pipe pressure chamber 185 on one side and a control reservoir pressure chamber 186 on its opposite side.

The diaphragm follower member 181 is provided with a threaded stud 187 which is integrally attached thereto at its one end and which extends through a central opening 188 in the follower member 182 into the control reservoir pressure chamber 186 to accommodate the nut 183 which secures the two follower members together one with the other and to the diaphragm 184, as previously described. An opening 189 extends from the face of the diaphragm follower member 181 in exposure to the brake pipe pressure chamber 185 through said follower member and part way into the integral stud 187 to accommodate one end of a cylindrical stem 190 which extends through said brake pipe pressure chamber and through a bore 191 in the partition 176 into the non-pressure chamber 174 for abutment with the projecting end of the stud 164 attached to the diaphragm follower member 162.

A retarded recharge control spring 192 is disposed in the control reservoir pressure chamber 186 and is interposed between an end wall 193 of the cap member 179 and an inwardly extending flange 194 of an annular spring follower element 195 which also has an outwardly extending flange 196 for cooperation with an annular stop shoulder 197 formed in a fixed annular stop element 198.

The annular stop element 198 is provided with a radially outward extending flange portion 199 which is secured to the cap member 179 within an accommodating annular recess formed therein by means of a plurality of machine screws such as the machine screw 200 shown in the drawing. The spring 192 urges the follower element 195 toward the position in which it is shown in the drawing defined by engagement of its outwardly extending flange 196 with the stop shoulder 197 formed in the fixed annular stop element 198.

At the side of the diaphragm assemblage including follower members 162 and 163 and the diaphragm 166 opposite to the side of the non-pressure chamber 174 there is a brake cylinder pressure chamber 201 which is closed at one end by said assemblage, is closed at its opposite end by the end wall 148 in the main casing portion 7, and is closed at its outer periphery by the cylindrical surface 149. Such brake cylinder pressure chamber 201 is in constantly open communication with the brake cylinder passageway 74 in the main casing portion 7.

A compression spring 202 is disposed in the brake cylinder pressure chamber 201 and is in abutment at its one end with an annular shoulder 203 formed in the main casing portion 7 and at its opposite end is in abutment with an inwardly extending flange 204 of an annular spring follower element 205 which also has an outwardly extending flange 206. The flange 204 of follower element 205 is urged by the spring 202 into engagement with one face of the follower member 162 and such flange is retained radialwise with respect thereto by virtue of peripheral engagement with a cylinder locating surface 207 formed in said follower member 162 coaxially therewith.

A fixed stop element 208, in the form of a snap ring, is mounted in an acommodating groove in the main casing portion 7 which extends radially outward from the cylindrical surface 149. Stop element 208 projects into the brake cylinder chamber 201 in the path of travel of the outer flange 206 of spring follower element 205. Such stop element 208 functions only during disassemblage of the service valve device 88, and acts in conjunction with the spring follower element 205 when its flange 206 is in engagement with said stop element, to retain the spring 202 within the respective cavity in the main casing portion 7 while the respective diaphragm assemblage including the slide valve 156 is removed from said main casing portion via its mounting surface 122 subsequent to removal of the cap member 179, casing member 171, and retaining ring 167. Otherwise, the spring follower element 205 and stop element 208 serve no useful purpose during operation of the brake controlling valve device 1. During operation of the service valve 88 when assembled and complete, travel of the diaphragm stack including the spring follower element 205 in the direction of chamber 186 is limited through the medium of the stem 190 by engagement of the diaphragm follower member 182 with an annular stop shoulder 209 formed on the annular stop element 198 opposite to its stop shoulder 197, while the spring follower element is held unseated from shoulder 197 against opposition of the spring 192.

The charging cut-off valve device 89 comprises a cylindrical slide valve 210 which is in slidably-guided, sealed cooperation with the wall of a bore 211 formed in the main casing portion 7. Valve 210 is operably connected to a diaphragm follower member 212 through the medium of a stem 213 in the form of an integral extension of said valve which is in turn in integral attachment with said follower member.

The outer peripheral edge of the follower member 212 is in slidably-guided cooperation with the cylindrical wall of a counterbore 214 formed in said casing portion through its mounting surface 144 and terminating at a radial stop shoulder 215 also formed in said casing portion. An annular section of one face of said follower member 212 is adapted for engagement with said stop shoulder 215 to define the limit of travel of said follower member in the direction of said shoulder and thereby limit the extent of movement of the stem 213 and valve 210 in the corresponding direction.

Intermediate the bore 211 and the counterbore 214 in the main casing portion 7 a cavity is formed to define a non-pressure chamber 216 which accommodates disposition of a compression spring 217; said non-pressure chamber being in constantly open communication with the atmosphere via a port 218 opening through said main casing portion.

One end of the spring 217 abuts the face of the diaphragm follower member 212 which is exposed to the non-pressure chamber 216, while the opposite end of said spring engages an outwardly extending radial shoulder 219 formed in an annular spring keeper element 220 encircling said stem 213. The keeper element 220 is urged by the spring 217 to assume and remain in the position in which it is shown in the drawing in engagement with an annular surface 221 formed in the main casing portion 7 in encirclement of the end of the bore 211 opening into the non-pressure chamber 216.

The counterbore 214 in the main casing portion 7 extends inwardly from the mounting surface 144 thereof to provide for removal of the assemblage including the follower member 212, stem 213, valve 210, etc., while a portion of cap member 152, having a corresponding mounting surface 222 for abutment with said surface 144 and a stop surface 223, encloses the respective end of said counterbore.

A flexible diaphragm 224 of resilient reinforced material is fit over a suitably contoured accommodating portion of the diaphragm follower member 212 in abutment therewith and is clamped at its outer periphery between the cap member 152 and the main casing portion 7. The diaphragm 224 serves to define a movable end wall of a control reservoir pressure chamber 225 which is closed by the cap member 152; said control reservoir pressure chamber 225 being in constantly open communication with a branch of the control reservoir passageway 28 in the main casing portion 7 by way of a corresponding control reservoir passageway 28 formed in the cap member 152 and registering openings in the mounting surfaces 144 and 222, respectively.

An inwardly-extending radial shoulder 226 is formed in the keeper element 220 for abutment with an annular divided stop ring 227 which is snap fit in an annular groove formed in the outer periphery of the stem 213, to limit the extent of movement of said stem and attached follower member 212 by the spring 217 in the direction of the control reservoir pressure chamber 225 and to retain the spring, stem, and follower member in assemblage during insertion and removal via the counterbore 214 when desired.

The slide valve 210 is provided with a central passage 228, extending longitudinally therein, which opens at one end through the end of said slide valve into a chamber 229 defined by an end wall 230 formed in the main casing portion 7 at the end of the bore 211, the peripheral walls of said bore and the end of said valve, and which passage 228 opens radialwise at its opposite end into an annular groove 231 formed in the outer periphery of the valve 210 for registry with a respective end of a branch of the brake pipe passage 75 which opens radialwise through the wall of said bore.

The chamber 229 is in constantly open communication with a branch of the passageway 76 which opens thereinto through the end wall 230.

The charging valve device 90 comprises a slide valve 232 of cylindrical shape which is slidably guided at its outer periphery by the wall of a bore 233 formed in the main casing portion 7 and terminating at an end wall 234. One end of the slide valve 232 is integrally attached to a diaphragm follower member 235 comprised in an assemblage including a diaphragm 236 which is subject opposingly to pressure of fluid in a non-pressure chamber 237 on one side and to a control chamber 238 at its opposite side.

The non-pressure chamber 237 is constantly open to the atmosphere by way of a vent port 239 and is defined by the walls of a cavity formed in the main casing portion 7 in extension from the mounting surface 144 thereof in encirclement of a portion of the valve 232 and the assemblage including the diaphragm 236 and follower member 235. A compression spring 240 is disposed in the non-pressure chamber 237 in encirclement of the slide valve 232 and in abutment at its opposite ends with an accommodating portion of the main casing portion 7 and the follower member 235, respectively. The spring 240 urges the assemblage including the follower member 235 and slide valve 232 to a charging position defined by engagement of the diaphragm 236 with a stop surface 241 formed in the portion of the cap member 152 which forms an end wall of the control chamber 238.

The control chamber 238 is in constantly open communication with a branch of the charging valve device control passageway 79 in the main casing portion 7 by way of a corresponding passageway 79 in the cap member 152 and by way of registering openings in the mounting surfaces 222 and 144, respectively.

The clearance volume space between the end of the slide valve 232 and the end wall 234 within the bore 233 is vented to the atmosphere by way of a central passageway 242 extending longitudinally through said slide valve into constantly open communication, adjacent the follower member 235, with the non-pressure chamber 237 to prevent entrapment of fluid within said clearance volume space which otherwise might interfere with travel of said slide valve.

The slide valve 232 is provided with an annular groove 243 in its outer periphery which is in constantly open communication with a branch of the passageway 76 opening radialwise into the wall of the bore 233, and is also adapted for registry in addition to said passageway 76 with a branch of the control reservoir passageway 28 also opening into the wall of said bore. In addition, the valve 232 is also provided with a similar groove 244 which is in constantly open communication with a branch of the supply reservoir passageway 68 and is adapted for registry in addition to said passageway 68 with a branch of the passageway 78, according to position of said valve.

The interlock valve device 91 comprises a cylindrical slide valve 245 which is slidably guided by the wall of a bore 246 formed in the main casing portion 7 and terminating at an end wall 247. The slide valve 245 extends from the bore 146 through a brake pipe pressure chamber 248 into integral attachment with a diaphragm follower member 249.

The diaphragm follower member 249 is operably attached to a flexible diaphragm 250, of resilient reinforced material, through the medium of an annular follower member 251 in a control reservoir pressure chamber 252 and a nut 253 also therein which abuts said follower member 251 and is in screw-threaded attachment with a stud 254 integrally attached to the diaphragm follower member 245 and extending centrally through said follower member 251 to clamp said diaphragm between the two follower members.

In the device 91, the brake pipe pressure chamber 248 is defined by the diaphragm 250 assemblage and by the peripheral wall and end wall of a cavity formed in the main casing portion 7 in open extension from its mounting surface 144 to permit removal and insertion of said assemblage.

A compression spring 255 is disposed in the brake pipe pressure chamber 248 in encirclement of the valve 245 and in abutment at its one end with a portion of the main casing portion 7 and at its opposite end with the diaphragm follower member 249 to urge said follower member and attached valve 245 in the direction of the control reservoir pressure chamber 252 toward a quick service continuation position in which it is shown in the drawing defined by engagement of the projecting end of the stud 254 with a stop surface 256 formed in a respective section of the cap member 152 which encloses and defines a fixed wall of the control reservoir pressure chamber 252.

The control reservoir pressure chamber 252 is in constantly open communication with the control reservoir passageway 28 in the main casing portion 7 by way of a branch of the corresponding passageway 28 in the cap member 152.

The brake pipe pressure chamber 248 in device 91 is in constantly open communication with a respective branch of the passageway 77.

In the main casing portion 7, defined by the end of the slide valve 245, the end wall 247 and the peripheral cylindrical wall of the bore 246 there is a quick service volume pressure chamber 257 which is in constantly open communication with a branch of the quick service passageway 16.

A central passageway 258 extends longitudinally in the slide valve 245 and opens through the projecting end thereof into the chamber 257 at one end and at its opposite end opens radialwise into an annular groove 259 formed in the outer periphery of said slide valve for registry with the respective end of a branch of the brake cylinder passageway 73 which opens radialwise through the wall of the bore 246.

A similar groove 260 is formed in the outer periphery of the slide valve 245 in exposure to the wall of the bore 246 for registry with a respective branch of the supply reservoir passageway 68 which opens radialwise through the wall of the bore 246.

One end of the charging valve device control passageway 79 also opens radialwise through the wall of the bore 246 for communication with the chamber 257 or with the groove 260 according to position of the slide valve, as will be described in detail hereinafter.

The control reservoir charging check valve device 92 comprises a check valve 261 disposed within a cavity formed in the main casing portion 7 in extension from its mounting face 144 to provide for removal of said check valve with the cap member 152 detached from said main casing portion. With the cap member 152 assembled to the main casing portion 7, the check valve 261 is urged toward a closed position in engagement with a seat 262 by a light bias spring 263 which is interposed between said check valve and the cap member 152 and is accommodated by a recess formed in said cap member. The check valve 261 controls communication between an inlet chamber 264 at one side of the seat 262 and an outlet chamber 265 at the opposite side of the seat.

The inlet chamber 264 is in constantly open communication with a branch of the brake pipe passageway 12, and the outlet chamber 265 is in constantly open communication with the input to the control reservoir fast charging control choke 83.

The check valve device 92 permits flow of fluid under pressure from its inlet chamber 264 to its outlet chamber 265 while preventing flow of fluid under pressure in the opposite direction.

The control reservoir overcharge check valve device 93 comprises a check valve 266 disposed in a cavity in the main casing portion 7 extending inwardly from its mounting surface 144 thereof and closed by the cap member 152. Check valve 266 cooperates with a seat 267 to control communication between an inlet chamber 268 at one side of said seat and an outlet chamber 269 at the opposite side.

The inlet chamber 268 is in constantly open unrestricted communication with a branch of the passageway 76 and by way of the control reservoir slow charging control choke 84, is in constantly open restricted communication also with a branch of the passageway 77; while the outlet chamber 269 is in constantly open communication with a branch of said passageway 77 without restriction.

The check valve 266 in the device 93 is arranged to permit flow of fluid under pressure from the inlet chamber 268 to the outlet chamber 269 and to prevent flow of fluid under pressure in the reverse direction.

The supply reservoir charging check valve device 94 comprises a check valve 270 urged by spring 271 in the direction of a seat 272 to control communication between an inlet chamber 273 at one side of said seat and an outlet chamber 274 at the opposite side of said seat.

The outlet chamber 274 is formed by a cavity in the main casing portion 7 in extension from its mounting surface 144 to provide for insertion and removal of the check valve 270 while the cap member 152 is detached.

The outlet chamber 274 is in constantly open communication with a branch of the supply reservoir passage 68; while the inlet chamber 273 is in constantly open communication with a branch of the passageway 77.

The spring 271 is disposed within a cavity formed in a respective portion of the cap member 152 and abuts at its one end an end wall of said cavity and at its opposite end is operatively connected to the check valve 270 through the medium of a spring follower element 275.

The check valve 270 is arranged to permit flow of fluid under pressure from the inlet chamber 273 to the outlet chamber 274 when the pressure of fluid in said inlet chamber is sufficiently great to unseat said valve against the bias of the spring 271, and to prevent flow of fluid under pressure in the reverse direction.

The supply reservoir overcharge check valve device 95 comprises a check valve 276 which is cooperative with a seat 277 to control communication between an inlet chamber 278 and an outlet chamber 279. The outlet chamber 279 is formed within the main casing portion 7 at the output side of the seat 276 by a cavity in said main casing portion extending from its mounting surface 144 and closed by the cap member 152 to provide for insertion and removal of the check valve 276 during disassembly of the equipment.

The inlet chamber 278 is in constantly open restricted communication with a branch of the passageway 77 by way of the supply reservoir slow charge control choke 85 and is in constantly open unrestricted communication also with a respective branch of the passageway 78. The outlet chamber 279 is in constantly open communication with one end of the supply reservoir overcharge dissipation passageway 13.

To accommodate the brake cylinder inshot valve device 96, there is formed in the main casing portion 7 a counterbore 280 extending inwardly from the mounting face 144 of said casing portion into coaxial junction with a second counterbore 281 of lesser diameter which in turn extends into coaxial junction with a bore 282 in turn extending into coaxial junction with a generally cylindrical shaped brake cylinder pressure chamber 283. At the junction of the counterbores 280 and 281 there is formed in the main casing portion an annular shoulder 284, and at the junction of said counterbore 281 with the bore 282 there is formed an annular shoulder 285; both of which shoulders extend radialwise with respect to the axis of the counterbores and bore.

The brake cylinder inshot valve device 96 comprises a valve guide 286 in the form of a thin hollow cylinder disposed coaxially within the brake cylinder pressure chamber 283 for slidable engagement by the outer peripheral edge of a circular poppet-type valve 287 for guiding said valve toward and away from an annular valve seat 288 formed in a hollow cylindrical seat element 289 fit in the bore 282 and integrally attached to said valve guide. The interior of the valve guide 286 is constantly open to the exterior by way of ports 290 extending radialwise therethrough so that both the interior and the exterior will in effect constitute portions of the brake cylinder pressure chamber 283 which is in constantly open communication with a branch of the brake cylinder passageway 72 in the main casing portion 7.

A compression spring 291, disposed coaxially within the brake cylinder pressure chamber 283, abuts an accommodating portion of the main casing portion 7 at its one end and a central portion of the valve 287 at its opposite end, to urge said valve in the direction of its seat 288.

To act as a medium through which the valve 287 may be unseated there is a valve stem 292 which is in slidably guided cooperation with the walls of a bore 293 in a guide element 294 and which stem projects through the interior of the hollow seat element 289 into abutment at its opposite end with the central portion of the valve 287.

Guide element 294 comprises a portion in close fit with the wall of the bore 282 and in integral attachment within said bore with the seat element 289. Guide element 294 also comprises a portion having a radially extending annular shoulder for abutment with the annular shoulder 285 formed in the main casing portion 7 to locate the attached seat element 289 and valve guide 286 axialwise within the casing.

At the junction of the guide element 294 with the seat element 289 there is formed an annular chamber 295 exposed at its outer periphery to the wall of the bore 282 and to a branch of the brake cylinder passageway 21 opening radialwise therethrough and is open at its inner periphery to the interior of the hollow seat element 289 by way of radial ports 296.

In close fit at its outer periphery with the peripheral wall of the counterbore 281 there is an annular backup ring 297 integrally attached to the guide element 294.

Within the counterbore 281 at one side of the backup ring 297 and in encirclement of a portion of the guide element 294 there is formed an annular brake cylinder pressure chamber 298 which is in constantly open communication with a branch of the brake cylinder passageway 22 formed in the main casing portion 7 and, by way of radial ports 299 formed at the junction of said ring 297 with the guide element 294, said chamber 298 is constantly open also to a central brake cylinder pressure chamber 300 at the interior of said ring.

Integrally attached to a respective end of the stem 292 there is a diaphragm follower element 301 which is disposed in the brake cylinder pressure chamber 300 and to which the inner peripheral edge of an annular flexible folded diaphragm 302 is clamped for movement therewith by means of a second follower member 303 at the opposite side of said diaphragm and a threaded stud portion 304 of said follower element 301 to which a nut 305 is attached.

A retaining ring 306, held in place by abutment with the mounting surface 222 of the cap member 152 and located axialwise within the counterbore 280 by abutment with the annular shoulder 284, is adapted for suitably clamping the outer peripheral edge of the diaphragm 302 in proximity with the annular backup ring 297.

A compression spring 307, disposed in a non-pressure chamber 308 constantly open to the atmosphere by way of a vent port 309 in the cap member 152, is provided for urging the diaphragm assemblage, including stem 292, in the direction of the brake cylinder pressure chamber 283. One end of the compression spring 307 is suitably accommodated by a cavity formed in the cap member 152 and abuts a portion thereof, while the opposite end of said spring is suitably accommodated in an annular space formed between the inner periphery of the follower member 303 and the outer periphery of the nut 305 and abuts a portion of said follower member. The spring 307 urges the diaphragm assemblage including stem 292 to the position in which they are shown in the drawing defined by engagement of an annular shoulder 310, formed in a portion of the follower element 301, with a portion of the face of the guide element 294 in encirclement of the respective end of the bore 293. In such position of the stem 292, the valve 287 is held disposed away from its seat 288 against opposition of the light bias spring 291.

OPERATION

Assume that the brake controlling valve device 1 is on a car in a train; that the brake pipe 4 connected to the brake pipe passageway 11 in the pipe bracket portion 6 is in turn interconnected with the respective sections of brake pipe on the various cars throughout the train; that the brake pipe passageway 12 in the pipe bracket portion 6 is connected, by virtue of the position of the cut-out cock 41, to the brake pipe passage 11; that the service selector valve device 86 is in its freight position in which it is shown on the drawing and in which the slide valve 98 blanks off passageways 32, 34 and 25 while communication is established between passageways 31 and 70, passageways 34 and 71, and passageways 24 and 72; and finally, assume that brake pipe 4, the supply reservoir 3, the brake cylinder device 5, the control reservoir 2, and all chambers and passageways in the brake controlling valve device 1 are devoid of any fluid under pressure above that of the atmosphere.

With its brake pipe pressure chamber 132 and its supply reservoir pressure chamber 133 devoid of fluid under pressure, the quick service valve device 87 will be in its repose position in which it is shown in the drawing, defined by engagement of the stud 126 with stop surface 138 by virtue of action of the spring 134, and the slide valve 124 will be positioned to blank off the respective branch of the quick service passageway 16 from grooves 141 in said slide valve, hence from said chamber 132 and brake pipe passageway 12 connected thereto.

With its brake cylinder pressure chamber 201, its brake pipe pressure chamber 185, and its control reservoir pressure chamber 186, devoid of fluid under pressure, the diaphragm stack of the service valve device 88 will be in a brake release position in which it is shown in the drawing and in which position the annular spring follower element 195 is held seated against the fixed stop element 198 by action of the retarded recharge control spring 192 and the diaphragm follower member 182 is held in engagement with said spring follower element 195 by action of the compression spring 202 in the brake cylinder pressure chamber 201 through the medium of the spring follower element 205, the diaphragm follower member 162, the stud 164 attached thereto, the stem 190, the stud 187, and the diaphragm follower member 181 attached to said stud and secured to said follower member 182.

In the position of the diaphragm follower member 162 corresponding to abutment of the diaphragm follower member 182 with the spring follower element 195 as above described, the slide valve 156 attached to said follower member 162 will be disposed away from brake cylinder supply control valve 154, the groove 160 in said slide valve will be in registry with both exhaust passageways 70 and 71, and the groove 161 in said slide valve will be in registry with both the brake pipe passageway 12 and with the passageway 77.

With the slide valve 156 disposed away from the brake cylinder supply control valve 154, said valve will be held closed in seating engagement with the seat 147 by the spring 155 and the respective brake cylinder passageway 72 will be opened to the brake cylinder release passageway 158 in said slide valve by way of the annular passageway 157 and clearance space between the end of the slide valve and supply control valve 154.

With the groove 161 in the slide valve 156 of the service valve device 88 in registry with both the brake pipe passageway 12 and passageway 77, communication is thereby established between these two passageways.

With its control reservoir pressure chamber 225 devoid of fluid under pressure, the charging cut-off valve device 89 will be in a position in which it is shown in the drawing defined by engagement of its diaphragm 224 with the stop surface 3 formed in the cap member 152, as urged thereto by action of the compression spring 217 in the non-pressure chamber 216, through the medium of the diaphragm follower member 212.

In the corresponding position of the slide valve 213 attached to the follower member 212, the annular groove 231 in said slide valve will be in registry with respective branch of the control reservoir supply passageway 75 which will thus be in open communication with the respective branch of the passageway 76 by way of said groove 231, the passageway 228 in the said slide valve 210, and the chamber 229.

With its control chamber 238 devoid of fluid under pressure, the charging valve device 90 will be in the position in which it is shown in the drawing defined by engagement of the diaphragm 236 with the stop surface 241 formed in the cap member 152, as urged thereto through the medium of the diaphragm follower member 235 by action of the spring 240 disposed in the non-pressure chamber 237.

In the corresponding position of the slide valve 232 attached to the diaphragm follower member 235, the annular groove 243 in said slide valve is in registry with both the respective branch of the control reservoir passageway 28 and the respective branch of the passageway 76, while the annular groove 244 in said slide valve is in registry with both the respective branch of the passageway 78 and the respective branch of the supply reservoir passageway 68.

With its control reservoir pressure chamber 252 devoid of fluid under pressure, the interlock valve device 91 will be in a position in which it is shown in the drawing defined by engagement of the stud 254 attached to diaphragm follower member 249 with the stop surface 256 formed in the cap member 152, as urged thereto by action of the compression spring 255 disposed in the brake pipe pressure chamber 248.

In the corresponding position of the slide valve 245 attached to the diaphragm follower member 249, the annular groove 259 is in registry with the respective branch of the brake cylinder passageway 73, and the respective branch of the charging valve device control passageway 79 is uncovered and open to the quick service volume pressure chamber 257, while the groove 260 in said valve is open to the respective branch of the supply reservoir passageway 68.

With the groove 259 in registry with the respective branch of the brake cylinder passageway 73, said passageway will be open to the quick service volume pressure chamber 257, hence to the respective branch of the quick service passageway 16 by way of the passageway 258 in the slide valve 245, as well as to the charging valve device control passageway 79 via said chamber 257.

In the check valve devices 92, 93, 94 and 95, with their respective chambers devoid of fluid under pressure, the check valves 261, 266, 270, and 276, respectively, will be seated.

With its brake cylinder pressure chamber 300 devoid of fluid under pressure, the brake cylinder inshot valve device 96 will be in a position in which it is shown in the drawing, defined by engagement of the annular shoulder 310 of the diaphragm follower member 301 with the guide element 294, and in which position the valve 287 is held unseated against opposition of the light bias spring 291 by the compression spring 307 disposed in the non-pressure chamber 308. By way of the unseated valve 287, the interior of the hollow seat element 289, ports 296 therein, and the annular chamber 295, the chamber 283, hence the brake cylinder passageway 72, is open to the brake cylinder passageway 21.

*Initial charging of the brake apparatus*

To initially charge the brake equipment on the various cars of the train, as well as to recharge the brake equipment during the release of the brakes after a brake application, it is customary to move the usual engineer's brake valve device (not shown) on the locomotive first to the usual release position for supplying fluid at a relatively high pressure directly from the usual main reservoir on the locomotive to the brake pipe 4 at the locomotive, thence after a lapse of a period of time, as determined by the operator of the brake valve device according to different conditions, the brake valve device will be moved to the usual running position to reduce pressure of further supply of fluid to the brake pipe to a normal value for continued charging of the brake pipe throughout the train to the normal pressure to be carried therein. The pressure on the brake pipe on the first, perhaps fifteen, cars of the train will therefore be initially increased to a degree in excess of the degree normally carried. The above-mentioned time which the brake valve device is allowed to remain in release position as well as the number of cars in the train and the equipment thereon, determines the number of cars on which the brake pipe becomes overcharged and the duration of such overcharge.

Upon supply of fluid under pressure to the brake pipe 4, as above-described, fluid under pressure will flow thereby from car to car, and on each car of the train which is brake equipped, will flow from the brake pipe 4 to the respective brake controlling valve device 1 on each car into the brake pipe passageway 11, chamber 43 and passage 46 of angle cock 41 in the brake pipe cutout valve device 39, and passageway 12 in the respective pipe bracket portion 6, to the corresponding brake pipe passageway 12 in the respective main casing portion 7, thence to the brake pipe pressure chamber 132 in the quick service valve device 87, to the brake pipe pressure chamber 264 in the control reservoir charging check valve device 92, and to the annular groove 161 in the slide valve 156 of the service valve device 88 in its release position according to the previous assumption to that effect.

Fluid under pressure from the brake pipe passageway 12 supplied to the chamber 264 in the control reservoir charging check valve device 92 will act on the control reservoir charging check valve 261 and unseat same against the opposition of the light bias spring 263. Fluid under pressure from chamber 264 will then flow past the unseated valve 261 into and through the outlet chamber 265, the control reservoir fast charge control choke 83, the fast rate control reservoir supply passageway 75, the groove 231 and passageway 228 in the slide valve 210 of the charging cut-off valve device 89, and the chamber 229 therein into the passageway 76, thence by way of the groove 243 in the slide valve 232 of the charging valve device 90, such fluid under pressure will flow from the passageway 76 into and through the control reservoir passageway 28 and the branches thereof to the control reservoir pressure chambers 225, 252 and 186, in the charging cut-off valve device 89, the interlock valve device 91, and the service valve device 88; respectively, and, by way of the pipe 29, such fluid under pressure will flow from said passageway 28 to the control reservoir 2 which thereby will become charged at a relatively rapid rate as controlled by the degree of pressure established in the brake pipe 4 on any particular car and the control reservoir fast charge control choke 83 in the brake controlling valve device on such car.

At the same time, fluid under pressure from the respective branch of the brake pipe passageway 12 in supply to the groove 161 of the slide valve 156 in the service valve device 88 will flow via said groove into and through the passageway 77, and via the respective branches thereof, will flow to the pressure chamber 185 in the service valve device 88 by way of the stabilizing choke 81, to the inlet chamber 273 in the supply reservoir charging check valve device 94, and to the choke 85 associated with the passageway 77.

Fluid under pressure thus supplied to the inlet chamber 273 in the supply reservoir charging check valve device 94 will act on the face of the check valve 270 exposed to said inlet chamber within the confines of the seat 272 and overcome the action of the spring 271 to open said chamber 273 to the outlet chamber 274 and permit flow of fluid under pressure from the former to the latter and thence to the supply reservoir 3 by way of the supply reservoir passageway 68 and the pipe 69, whereby said reservoir will become pressurized.

At the same time, fluid under pressure made available to the supply reservoir slow charging control choke 85 via the passageway 77 will flow at a relatively slower rate also to the supply reservoir 3 by way of the chamber 278 in the supply reservoir overcharge check valve device 95, the passageway 78, the groove 244 in the slide valve 232 of the charging valve device 90, the supply reservoir passageway 68, and the pipe 69.

Also at the same time, pressure of fluid as realized in the control reservoir 2 by supply of fluid under pressure thereto via the passageway 28 as previously described, is experienced simultaneously in the control reservoir pressure chamber 186 in the service valve device 88, and the pressure of fluid in supply to the supply reservoir 3 by way of check valve device 94, the passageway 77, and groove 161 in said service valve device, is realized by way of the choke 81 in the pressure chamber 185 in said service valve device.

During the initial stages of supply of fluid under pressure from the brake pipe passageway 12 to the passageway 77 and thence to the supply reservoir 3 as previously described, the groove 161 in the slide valve 156 of the service valve device 88 will be in complete registry with both the open end of the respective branch of the brake pipe passageway 12 opening into the bore 145 as well as with the passageway 77, so that flow between the two passageways 12 and 77 will be without restriction momentarily, while flow of fluid under pressure from another respective branch of the brake pipe passageway 12 to the control reservoir 2 by way of the control reservoir charging check valve device 92 and the control reservoir fast charging control choke 83 as previously described, is restricted to a certain degree by flow through said choke. As a result, pressure of fluid in the passageway 77 and hence in the pressure chamber 185 in the service valve device 88 will momentarily increase at a greater rate, consequently to a greater degree in a given short interval of time, than that pressure of fluid in supply to the control reservoir as experienced in the control reservoir pressure chamber 186 in said service valve device; the latter chamber being in constantly open communication with the passageway 28 through which fluid under pressure is supplied to said control reservoir from the choke 83 by way of communications, passageways, etc., previously traced. When the pressure of fluid in the pressure chamber 185 in the service valve device 88, increasing at a greater rate than that of the control reservoir pressure in chamber 186 in said service valve device, preponderates over pressure in said chamber 186 to the extent of such as seven-tenths of a pound, the diaphragm follower members 181 and 182 will be caused to move in the direction of said control reservoir pressure chamber against opposition of the spring 192 and carry the spring follower element 195 away from the annular shoulder 197 on fixed stop element 198, while the spring 202 in the brake cylinder pressure chamber 201 causes the diaphragm follower member 162 and attached slide valve 156 to follow such movement through the medium of the stem 190 which slides through the bore 191 during transportation thereof. Such movement of the slide valve 156 causes partial closure to a progressively greater extent of the end of the respective branch of the brake pipe passageway 12 opening into groove 161, with the consequent progressive increase in the degree of restriction imposed to flow of fluid under pressure from said passageway 12 into the passageway 77 for supply to the supply reservoir, and with the result that pressure of fluid in said passageway is thus reduced to a degree according to position of the slide valve 156. The consequent regulation in supply of fluid under pressure from the brake pipe passageway 12 to the passageway 77 by the diaphragm stack will continue automatically to maintain a balance between the pressure of fluid in chambers 185 and 186 in the service valve device 88 so that the rate of increase in pressure of fluid in each of said chambers is substantially the same.

Conversely, once having established a balance of pressures in chambers 185 and 186 as above described, the diaphragm stack of the service valve device 88 will respond automatically to a reduction in degree of preponderance in pressure of fluid in its chamber 185 over that in chamber 186 below the seven-tenths of a pound chosen example, by action of the spring 192 upwardly, as viewed in the drawing, to carry the groove 161 in the slide valve 156 into more complete registry with the brake pipe passageway 12 to increase the rate at which fluid under pressure is supplied therefrom to the passageway 77 and thereby reestablish the desirable equality of rates of supply of fluid under pressure to supply reservoir 3 via said passageway 77 and to the control reservoir 2 via the passageway 28.

From the foregoing it will be apparent that during the stage of initial charging presently being described, pressure of fluid in the supply reservoir 3 will be increased at substantially the same rate and to substantially the same extent as that in the control reservoir 2 as determined by the control reservoir fast charging control choke 83. At any given moment, the pressure of fluid in the supply reservoir 3 will be within substantially one pound of that in the control reservoir 2 by virtue of the fact that the service valve device 88 automatically maintains pressure of fluid in the passageway 77, hence in the input chamber 273 of the supply reservoir charging check valve device 94, at seven-tenths of a pound in excess of that in the control reservoir 2, while a reduction in pressure of one and seven-tenths pounds is absorbed by the said charging check valve device 94 during flow of fluid under pressure from said inlet chamber 273 to the supply reservoir 3 by way of its outlet chamber 274 in order to maintain the check valve 270 unseated against action of the spring 271.

When the control reservoir pressure increases to a value of such as sixty-eight pounds, for example, as a result of supply of fluid under pressure thereto from the brake pipe passageway 12 by way of the control reservoir charging check valve device 92 and the control reservoir fast charging control choke 83 as previously described, such control reservoir pressure of sixty-eight pounds as experienced in the control reservoir pressure chamber 225 in the charging cut-off valve device 89, in acting on the diaphragm 224, will cause deflection of same and movement of the follower member 212, stem 213, and slide valve 210 in the direction of the chamber 229 against opposition of the spring 217 until the stop ring 227 carried by said stem engages the annular surface 221 and terminates further movement of stem, valve and follower member in that direction. Such movement of the slide valve 210 closes off communication between the first rate control reservoir supply passageway 75 and the passageway 76, whereupon, supply of fluid under pressure to the control reservoir 2 by way of said passageway 75 terminates.

Immediately upon the charging valve device 89 assuming, as above described, its position in which the passageway 75 is cut off from the passageway 76, fluid under pressure will continue to flow to the control reservoir 2 from the brake pipe passageway 12 by way of the groove 161 in the slide valve 156 of the service valve device 88, passageway 77, the control reservoir slow charging control choke 84, the chamber 268 in the control reservoir overcharge check valve device 93, the passageway 76, the groove 243 in the slide valve 232 of the charging valve device 90, passageway 28, and the pipe 29. At such time, it will be appreciated, that since the control reservoir pressure chamber 186 in the service valve device 88 is in unrestricted communication with the output side of the control reservoir charging control choke 84 by way of the passageway 28, the groove 243 in the slide valve 232 of the charging valve device 90, the passageway 76, and the chamber 268 in the control reservoir overcharge check valve device 93, and since the pressure chamber 185 in said service valve device is in relatively unrestricted communication with the input side of said control reservoir slow charging control choke 84 by way of the stabilizing choke 81, and a branch of the passageway 77; the service valve device 88 will respond automatically to influence of pressure of fluid in its chambers 185 and 186 to so regulate the position of its slide valve 156 that supply of fluid under pressure from the brake pipe passageway 12 to the passageway 77 will maintain the chosen seven-tenths of a pound preponderance in pressure in chamber 185, hence in the passageway 77 at the input side of the choke 84 over that in the chamber 268, hence in passageway 76 at the output side of said choke. At the relatively low pressure head of seven-tenths of a pound, the rate of supply of fluid under pressure exclusively from passageway 77 to the control reservoir by way of the choke 84 will occur at a relatively slow or trickle rate as pressure of fluid in the control reservoir 2 is thus caused to increase to values in excess of sixty-eight pounds.

Immediately prior to the closure of the charging cut-off valve device 89 in response to attainment of control reservoir pressure of sixty-eight pounds as above described, due to the fact that the service valve device 88 automatically regulates supply of fluid under pressure to the passageway 77 for charging the supply reservoir 3 at substantially the same rate as that of the control reservoir, and in view of the fact that such charging of said supply reservoir occurs substantially without restriction by way of the supply reservoir charging check valve device 94; the pressure of fluid in the supply reservoir 3 and as realized in the output chamber 274 in said supply reservoir charging check valve device 94 will be substantially equal to that in the control reservoir at that time, namely sixty-seven or sixty-eight pounds, for example. Upon closure of the charging cut-off valve device 89 at sixty-eight pounds control reservoir pressure, the resultant reduction in rate of supply of fluid under pressure to the passageway 77 via the service valve device 88 as previously described, affords ample time for fluid under pressure to flow from said passageway 77 to the supply reservoir passageway 68, hence to chamber 274 in the supply reservoir charging check valve device 94, by way of choke 85, the chamber 278 in the supply reservoir overcharge check valve device 95, the passageway 78, and the groove 244 in slide valve 232 of the charging valve device 90, that, as a result, the pressure of fluid at opposite sides of the check valve 270 will be equalized to the extent that said check valve no longer will be maintained unseated against opposition of the spring 271 by the pressure of fluid in the inlet chamber 273 and said check valve will be seated by said spring while fluid under pressure continues to flow to the supply reservoir 3 at a reduced rate exclusively by way of the said choke 85, said chamber 278, said passageway 78, said groove 244, said passageway 68 and the pipe 69.

During such continued charging of the supply and control reservoirs 3 and 2, respectively, at the relatively slow rate by way of the passageway 77 and the chokes 85 and 84, respectively, said chokes so proportion flow of fluid under pressure from the passageway 77 to said reservoirs that same will continue to be charged to substantially the same degree of pressure at any given time, irrespective of a difference between their sizes or capacities.

If, during such continued charging of the control and supply reservoirs 2 and 3 at a relatively slow rate to values in excess of sixty-eight pounds, the brake pipe 4 is at its normal full charge value of seventy-one pounds, for example, the value to which it is desired that said reservoirs become charged, then such flow will continue until equalization is attained between the pressure of fluid in said reservoirs and that in said brake pipe 4.

If, on the other hand, during such continued charging of the supply and control reservoirs 3 and 2, the brake pipe 4 is charged at values in excess of its normal full charge value of seventy-one pounds subsequent to the time that said reservoirs have attained their full normal charge value of seventy-one pounds, then these reservoirs will become overcharged above said normal full charge value at a restricted rate by way of chokes 85 and 84, respectively, as previously described.

Should the control reservoir 2 become overcharged, then upon reestablishment of normal pressure in the brake pipe 4 to seventy-one pounds, for example, the overcharge in the control reservoir 2 will be dissipated at a relatively rapid but controlled rate by flow of fluid under pressure from said control reservoir by way of the pipe 29, the passageway 28, the groove 243 in the slide valve 232 of the charging valve device 90, the passageway 76, the chamber 268 in the control reservoir overcharge check valve device 93, thence, by unseating the check valve 266 in said device 93, said fluid will flow from the chamber 268 without restriction to the passageway 77 in by-pass of the choke 84, and from said passageway 77 such fluid under pressure will flow to the brake pipe 4 for equalization in pressure therewith by way of the groove 161 in the slide valve 156 of the service valve device 88, the branches of the brake pipe passageway 12 in the main casing portion 7 and pipe bracket portion 6, and the passageway 45, passageway 46 in cut-out cock 41, port 44, chamber 43, and passageway 11 connected to the respective section of said brake pipe 4.

It should be pointed out that, during the time that overcharge may be in admission to the control reservoir 2, such will flow by way of the single choke 84 associated with the control reservoir overcharge check valve device 93, as previously described, at a low pressure differential across said choke 84 under control of the service valve device 88, while, during dissipation of such overcharge by flow of fluid under pressure from the control reservoir for equalization of pressure in said control reservoir with that in the brake pipe 4 when restored to its normal charge value of seventy-one pounds, for example, said control reservoir overcharge check valve device 93 automatically provides for less restricted communication between the control reservoir 2 and the brake pipe 4 in by-pass of the choke 84 so that overcharge will be dissipated at a faster rate than same can be admitted to the control reservoir, thereby reducing the tendency for such control reservoir 2 to be overcharged at a time when a subsequent brake application may be called for.

Correspondingly, when, upon existence of an overcharge in the supply reservoir 3, the pressure of fluid in the brake pipe 4 is reduced to its normal value of seventy-one pounds, for example, such overcharge in the auxiliary reservoir will be dissipated at a relatively rapid but controlled rate by flow of fluid under pressure therefrom by way of the pipe 69, the passageway 68, the groove 244 in the slide valve 232 of the charging valve device 90, passageway 78, the chamber 278 in the supply reservoir overcharge check valve device 95, thence to the brake pipe passageway 12, hence to the brake pipe 4, both by way of the check valve 276, the passageway 13, and the supply reservoir overcharge dissipation choke 14, as well as by way of the choke 85, the passageway 77, and the groove 161 in the slide valve 156 of the service valve device 88.

As in regard to flow of final charge into the control reservoir 2 and the dissipation of any overcharge therefrom, it will be seen that choke 85 will discourage entrance of overcharge into the supply reservoir 3, while the feature of combining the capacity of same automatically with that of the choke 14 provides for relatively rapid dissipation of such overcharge to reduce the tendency for said supply reservoir 2 to be overcharged at a time when brake application may be called for.

Upon equalization of the pressures in the control and supply reservoirs 2 and 3 with that in the brake pipe 4, all parts comprised in and associated with the brake controlling valve device 1, with the exception of the charging cut-off valve device 89 in its cut-off position, will be in their respective positions in which they are shown in the drawing; with the diaphragm stack in the service valve device 88 being returned by the retarded recharge control spring 192 to its position defined by engagement of the spring follower element 195 with follower member 182 and with the stop shoulder 197 on the fixed annular stop element 198.

Application and release of brakes

When it is desired to effect an application of brakes, a reduction in pressure in the brake pipe 4 will be initiated at the engineer's brake valve device on the locomotive in the well-known manner. In the brake controlling valve device 1 on any particular car, when the brake pipe pressure is reduced as just mentioned, the check valve 270 in the supply reservoir charging check valve device 94 will prevent any substantial flow of fluid under pressure from the supply reservoir 3 to the brake pipe by way of the pipe 69, the supply reservoir passageway 68, and said check valve device. However, momentarily there may be a slight flow from the supply reservoir 3 back to the brake pipe by way of said supply reservoir passageway 68, the groove 244 in the charging valve device 90, the passageway 78, the chamber 278 in supply reservoir overcharge check valve device 95, thence along the previously traced flow path through which overcharge is dissipated from said supply reservoir as previously described.

At the same time, the charging cut-off valve device 89, being in its lowermost position opposite to that in which it is shown in the drawing, and check valve 261 being interposed between the brake pipe passageway 12 and the fast rate control reservoir supply passageway 75, there will be no appreciable flow of fluid under pressure from the control reservoir 2 back to the brake pipe by way of said passageway 75. However, momentarily there may be slight flow of fluid under pressure from the control reservoir 2 back to the brake pipe 4 by way of the pipe 29, the passageway 28, the groove 243 in the slide valve 232 of the charging valve device 90, the passageway 76, the chamber 268 in the control reservoir overcharge check valve device 93, thence to the brake pipe via the previously traced flow path through which overcharge is dissipated from said control reservoir as previously described.

As a result of the initial reduction in brake pipe pressure as effected by operation of the engineer's brake valve device on the locomotive, pressure in the brake pipe 4 on the first car of the train will promptly reduce to that on the locomotive and when reduced, for example, such as seven-tenths of a pound, such reduction as experienced in the brake pipe pressure chamber 132 in the quick service valve device 87 at one side of the diaphragm 131 relative to the pressure of fluid in the supply reservoir pressure chamber 133 at the opposite side of said diaphragm 131 will create a sufficient differential in pressures on its opposite sides to deflect same against opposition of the spring 134 and move the slide valve 124 to its quick service position, defined by engagement of the shoulder 139 on follower member 125 with the casing shoulder 140, whereupon, said brake pipe pressure chamber 132 becomes open to the quick service volume chamber 15 and chamber 257 in interlock valve device 91 by way of the groove 141 in said valve 124, and respective branches of the quick service passageway 16.

Upon establishment of the connection between the brake pipe pressure chamber 132 in the quick service valve device 87 and the passageway 16 as above mentioned, fluid under pressure will flow from the brake pipe 4 on the particular car to the respective quick service volume chamber 15 by way of the passageway 11, the brake pipe cut-out valve device 39, the brake pipe passageway 12 in the pipe bracket portion 6 and main casing portion 7, said chamber 132, the groove 141 in the slide valve 124 of the quick service valve device 87, and the quick service pasageway 16.

At the same time, fluid under pressure from the brake pipe 4 thus supplied to the passageway 16 via the quick service valve device 87 will also flow to the control chamber 238 in the charging valve device 90 by way of the chamber 257 in the interlock valve device 91 and the passageway 79 open thereto in the position of said device 91 in which it is shown in the drawing. Such pressure of fluid in the control chamber 238 in the charging valve device 90, acting on the diaphragm 236 therein, will cause sufficient force to overcome action of the spring 240 and move or deflect said diaphragm in the direction of said spring and carry the slide valve 232 to a lap position defined by engagement of the end of said valve with the end wall 234 formed in the main casing portion 7. In such position of said valve 232, the reservoir charging and overcharge dissipating passageway 78 is cut off from the supply reservoir passageway 68 via the groove 244, and the passageway 76 is cut off from the control reservoir passageway 28 by way of the groove 243, thereby terminating, within a fraction of a second subsequent to the initial brake pipe pressure reduction, further loss of fluid under pressure from the control and supply reservoirs 2 and 3 by way of the previously mentioned respective overcharge dissipation flow paths to the brake pipe 4 as a result of such initial reduction.

By virtue of the connection established between the brake pipe 4 and the quick service volume chamber 15 during operation of the quick service valve device 87 to move its slide valve 124 to its quick service position as above-described, fluid under pressure from the brake pipe in flowing to the quick service volume chamber 15 as above-mentioned, will result in a fast local reduction in pressure in the brake pipe on that particular car which will be experienced in the brake pipe pressure chamber 185 in the respective service valve device 88 by way of the brake pipe passageway 12 and which will hasten reduction in pressure in the brake pipe on the next car of the train, which reduced pressure in the brake pipe on said next car, if such car is equipped with the subject brake apparatus, will be sufficient to cause operation of the corresponding quick service valve device 87 on that car to effect a similar local reduction in brake pipe pressure thereon, and so on, serially back through the train from car to car.

If, at the time that the brake pipe 4 on any particular car is thus connected to the respective quick service volume chamber 15 of the brake controlling valve device on that car, each car in the train is brake equipped, so that said quick service volume chamber will take care of only the volume of the brake pipe 4 on that car, then the reduction in pressure of fluid in the brake pipe and that car resultant from flow to the respective quick service volume chamber will be that calling for a certain degree of brake application or brake cylinder inshot pressure, such as a five pound reduction in brake pipe pressure below its normal charge value of seventy-one pounds, for example, for realization of a brake cylinder inshot pressure of nine pounds, for example.

If, on the other hand, at the time that the brake pipe 4 on any particular car is connected to the quick service volume chamber 15 in the brake controlling valve device 1 on that car, such car is followed by a number of cars on which there is no brake equipment or on which the brake pipe is piped straight through, then, the resultant reduction in pressure in the brake pipe 4 on the preceding brake-equipped car as a result of flow of fluid under pressure to the quick service volume chamber 15 on that car will be less than the required degree desired, namely the five pound reduction chosen as example, and such pressure in the brake pipe continues to be reduced for attainment of such five pound reduction by flow of fluid under pressure from the quick service volume passageway 16 to the brake cylinder device 5 by way of chamber 257 in the interlock valve device 91, the passageway 258 and groove 259 in the slide valve 245 thereof, the brake cylinder passageway 73, the quick service continuation regulating choke 80, the brake cylinder passageway 72, thence, without restriction, by way of the brake cylinder pressure chamber 283 in the brake cylinder inshot valve device 96, the unseated valve 287 in said device 96, the interior of hollow seat element 289, ports 296, annular chamber 295, the brake cylinder passageways 21 and 19, and the pipe 20. Such flow of fluid under pressure from the brake pipe to the brake cylinder device 5 for continuation of quick service reduction in brake pipe pressure by way of the brake cylinder passageway 72 and inshot valve device 96 will also flow to the atmosphere by way of said passageway 72 and, in the service valve device 88 in its release position in which it is shown in the drawing, by way of the annular passageway 157, the brake cylinder release passageway 158, ports 159 and groove 160 in the slide valve 156 unseated from the brake cylinder supply control valve 154, passageways 70 and 71, chamber 114 and groove 115, respectively, in the service selector valve device 86, passageways 31 and 33, respectively, chokes 35 and 37, respectively, and the passageway 30.

When flow of fluid under pressure from the brake pipe 4 to the quick service volume chamber 15 on any particular car alone is sufficient to cause the desired degree of quick service reduction in brake pipe pressure of such as five pounds as the chosen example, such quick service reduction in brake pipe pressure will transpire in a fraction of a second, while if flow to the brake cylinder device 5 or/and to the atmosphere as above-described is relied upon for continuation of quick service reduction in brake pipe pressure for realization of the desired degree in quick service reduction in brake pipe pressure, a period of time up to the extent of a matter of seconds may transpire before the desired five pound quick service reduction in brake pipe pressure is attained.

The reduction in pressure of fluid in the brake pipe 4 on any particular car is also experienced in the chamber 248 in the interlock valve device 91 of the respective brake controlling valve device 1 on that car by way of the brake pipe passageway 12, the groove 161 in the slide valve 156 of the service valve device 88, and the passageway 77. While the brake pipe pressure as experienced in the chamber 248 reduces to the desired degree of such as five pounds as the chosen example, from its normal full charge value of seventy-one pounds as the chosen example, the pressure of control reservoir fluid bottled up in the chamber 252 in the device 91 at its full charge value of seventy-one pounds, corresponding to the full normal charge value of the brake pipe 4, on the same car, will cause deflection of the diaphragm 250 in the direction of said chamber 248 against opposition of spring 255 and of the effect of pressure of fluid in chamber 257 on the end of valve 245 and carry the slide valve 245 to a quick service cut-off position defined by engagement of a portion of the diaphragm follower member 249 with the end wall of said chamber 248. In the quick service cut-off position of the slide valve 245, the quick service passageway 16 will remain open to the chamber 257 in the interlock valve device 91 as well as will the respective end of the central passageway 258 in said slide valve 245, but the groove 259 in said slide valve, connected to said passageway 258, will be blanked off from the brake cylinder passageway 73 to terminate communication between the quick service passageway 16 and the brake cylinder device and thus terminate continuation of quick service reduction in brake pipe activity; while the groove 260 in said slide valve 245 remains in communication with the supply reservoir passageway 68, but in addition becomes connected to the charging valve device control passageway 79 which will be cut off by the slide valve 245 from the quick service volume pressure chamber 257.

In addition to terminating continuation of quick service brake pipe reducing activity upon the slide valve 245 in the interlock valve device 91 assuming its quick service cut-off position as above described, establishment of registry of the groove 260 in said valve 245 with the passageway 79 in addition to the passageway 68 connects the control chamber 238 in the charging valve device 90 with the supply reservoir 3 by way of the passageway 79, said groove 260, the passageway 68, and the pipe 69 to maintain said chamber 238 pressurized for holding the slide valve 232 of said device 90 in its lowermost or reservoir charging cut-off position opposite to that in which it is shown in the drawing and to which it was caused to assume as previously described during the quick service brake pipe reducing activity.

The quick service reduction in brake pipe pressure will also be realized in the brake pipe pressure chamber 185 in the service valve device 88 in the respective brake controlling valve device on any particular car by way of the respective brake pipe passageway 12, the groove 161 in the slide valve 156 of said device 88, branches of the passageway 77 and the stabilizing choke 81. During the time that the previously described quick service reduction in brake pipe pressure to the desired degree of five pounds is transpiring, as soon as the broke pipe pressure is reduced to the extent of such as two and one-half pounds below its normal charge value of seventy-one pounds, the pressure of control reservoir fluid bottled up in the control reservoir pressure chamber 186 in the service valve device 88 will cause deflection of the diaphragm 184 in the direction of said brake pipe pressure chamber 185, and, through the medium of the attached follower members 181 and 182, the stem 190 slidably guided within the walls of the bore 191 in the partition 176, the stud 164 and follower members 162 and 163, will cause corresponding movement of the slide valve 156, against opposition of the compression spring 202, in the direction of the brake cylinder supply control valve 154 to abut same. Thereafter, continued reduction in brake pipe pressure to the extent of an additional one-half pound, for example, will be sufficient to cause the brake cylinder supply control valve 154 to be unseated by the slide valve 156 in opposition to the spring 155 and to pressure of fluid in the brake cylinder supply chamber 153 acting on said valve 154.

Upon initial engagement of the uppermost end of the slide valve 156, as viewed in the drawing, with the brake cylinder supply control valve 154 as above described, access to the brake cylinder release passageway 158 in said slide valve is cut off to the annular passageway 157 to terminate communication between the brake cylinder device 5 and the atmosphere, and such engagement continues as said valve 154 is subsequently unseated by said slide valve during its upward movement.

Unseating of the brake cylinder supply control valve 154 permits fluid under pressure from the supply reservoir 3, available to the chamber 153 in the service valve device 88 via pipe 69 and passageway 68, to flow through the opening 146 into and through the annular chamber 157 to the brake cylinder device 5 at a relatively rapid rate by way of the brake cylinder passageway 72, and, in the brake cylinder inshot valve device 96, the chamber 283, the unseated valve 287, the interior of the hollow seat element 289, the ports 296, the annular chamber 295, the brake cylinder passageways 21, 19 and the pipe 20.

Fluid under pressure is thus supplied from the supply reservoir 3 to the brake cylinder device 5 by way of the service valve device 88 substantially without restriction by way of the brake cylinder inshot valve device 96 on the particular car in discussion, with a resulting corresponding increase in brake cylinder pressure as the usual brake shoes (not shown) operably connected to said brake cylinder device are brought into engagement with the wheel. Such increase in the degree of brake cylinder pressure is realized in the brake cylinder pressure chamber 201 in the service valve device 88 by way of the passageway 74, stabilizing choke 82, and the brake cylinder passageway 72 through which such fluid under pressure is supplied to said brake cylinder device 5; said stabilizing choke 82 being active at such time to so regulate flow from said passageway 72 into the chamber 201 as to attain substantial correspondence between the pressure existent in the brake cylinder device and that in the chamber 201.

As fluid under pressure in supply to the brake cylinder device is thus increased as a result of an initial response of the service valve device 88 to reduction in brake pipe pressure to the extent of two and one half pounds as realized in its chamber 185, pressure of fluid in said brake pipe pressure chamber 185 will continue to be reduced as a result of the previously described quick service brake pipe reducing activity from two pounds below its normal full charge value to the desired degree of five pounds below such normal full charge value at a rate according to the rate in which quick service reduction in brake pipe pressure transpires as previously described in detail. Other influences on the diaphragm stack, such as the effect of pressure of control reservoir fluid in the pressure chamber 186, and of the springs 155, 202, and 192, remain equal, so that the slide valve 156 operably associated with the diaphragm stack will be caused to assume positions according to the opposing effects of the reduction in brake pipe pressure in the chamber 185 on the diaphragm 184 versus the effect of the increasing brake cylinder pressure in the chamber 201 on the diaphragm 166. The slide valve 156 will be automatically positioned such that the brake cylinder supply control valve 154 held unseated thereby will be moved varying distances relative to its seat 147 to so regulate admittance of fluid under pressure from the supply reservoir 3 to the brake cylinder device 5 that the rate at which fluid under pressure is supplied thereto will be in accordance with the rate at which quick service reduction in brake pipe pressure transpires.

When the brake pipe pressure as experienced in the chamber 185 in the service valve device 88 attains its full degree of quick service reduction, namely five pounds as the chosen example, below its normal charge value of seventy-one pounds, a slight increase in brake cylinder pressure as experienced in the chamber 201 above a certain value corresponding to that in the chamber 185 will cause, in assist by the compression spring 202 and by pressure of fluid in said chamber 201 movement of the diaphragm stack in the direction of the control reservoir pressure chamber 186, in opposition to pressure of fluid therein, to a lap position in which the brake cylinder supply control valve 154 is seated by spring 155 for closing off the brake cylinder supply chamber 153 to the annular chamber 157, hence to the brake cylinder device 5, while the uppermost end of the slide valve 156, as viewed in the drawing, remains seated on said valve 154 for maintaining the brake cylinder release passageway 158 closed off from said chamber 157, thereby maintaining a certain degree of pressure of fluid bottled up in the brake cylinder device 5 corresponding to the degree of brake pipe pressure reduction.

In the service valve device 88 of the device 1, the area of the diaphragm 166 exposed to pressure of fluid in the broke cylinder pressure chamber 201 relative to the area of the diaphragm 184 subject opposingly to pressure of fluid in the brake pipe pressure chamber 185 and to control reservoir pressure in chamber 186 is such that for every pound that brake pipe pressure is reduced from its normal full charge pressure below the two and one-half pounds necessary to overcome opposition of the spring 202 and friction of valve 156 to move the service valve device 88 to its application position, three pounds of brake cylinder pressure must be built up to return said service valve device to its lap position. Therefore, when in response to attainment of the desired degree of quick service reduction in brake pipe pressure in chamber 185 to sixty-six pounds, or in other words five pounds below the normal charge value of seventy-one pounds, chosen for example, the brake cylinder will attain a pressure of three times the three pounds of reduction in excess of two pounds required to overcome the bias of the spring 202 or, namely, approximately nine pounds.

Upon attainment of the nine pounds of brake cylinder pressure corresponding to the attainment of the desired degree of quick service reduction in brake pipe pressure, such brake cylinder pressure as realized in the brake cylinder pressure chamber 300 in the inshot valve device 96 by way of the pipe 20, the passageway 19 in the pipe bracket portion 6, stabilizing choke 23, the passageway 22 in the main casing portion 7, the chamber 298 and the ports 299 in said inshot valve device 96, will act on the diaphragm 302 thereof and cause deflection of same in the direction of the non-pressure chamber 308 in opposition to the compression spring 307 and, through corresponding movement of the attached stem 292, permit the spring 291 in the brake cylinder pressure chamber 283 to seat the valve 287 on the seat 288 and thereby close off communication between said chamber 283 and the chamber 295 by way of the interior of the hollow seat element 289 and the ports 296. Thereafter, any further increase in pressure of fluid in the brake cylinder device 5 above its inshot valve of such as nine pounds will travel from the service valve device 88 by way of the passageway 72, the groove 116 of the slide valve 98 of the service selector valve device 86, passageway 24 and choke 26, or/and passageway 25 and choke 27, according to position of said valve 98, the passageway 19 and the pipe 20. The size of the chokes 26 and 27 are such that when the choke 26 alone is employed as on a freight train, the rate of build-up of brake cylinder pressure will be so controlled as will prevent a too sudden increase in braking force as might result in a too rapid gathering of slack between cars, while the capacity of the choke 26 when combined with that of choke 27 assures smooth braking action of the cars on a passenger train.

For a given size brake cylinder device 5 on any particular car of a train, the degree of braking force realized on that car when the shoes are brought into engagement with the wheel by virtue of the inshot pressurization of said brake cylinder device to nine pounds, for example, as above described, will depend upon the leverage or braking ratio of the brake rigging interposed between said brake cylinder device and said shoes. In certain countries in Europe such as in Italy, for example, the leverage ratio of the brake rigging is such that the brake cylinder inshot pressure of such as nine pounds, for example, will bring the brake shoes into engagement with the wheel to take up the slack in the brake rigging without creating any material braking force effect on the car. In France, however, for example, the leverage ratio of the brake rigging interposed between the brake cylinder device 5 and the brake shoes on any particular car may be such that the brake cylinder inshot pressure of nine pounds, for example, will not only take up the slack in the brake rigging on that car and bring the brake shoes into engagement with the wheel, but, in addition, will cause said shoes to exert sufficient force on said wheels to restrain rotation of same for light brake applications on a train operating on the level or on slight down grades.

Such brake cylinder inshot pressure of nine pounds, for example, will automatically be effected by the brake controlling valve device 1 as aforedescribed in response to an initial reduction in brake pipe pressure initiated at the locomotive and propagated in the brake pipe 4 back through the train by serial operation of the quick service valve devices 87 in the valve devices 1 respective to the various cars. The reduction in brake pipe pressure at the locomotive may be limited to substantially the value necessary to trip the quick service valve device 87 on the first car of the train, after which, the brake valve device on the locomotive will be returned to lap position. In which case, pressure of fluid in the brake pipe 4 as automatically reduced by the respective brake controlling valve device 1 on the various cars of the train will remain at its quick service reduction value of five pounds below normal full charge value and corresponding to the desired brake cylinder inshot pressure of nine pounds, for example, or the brake valve on the locomotive may be allowed to remain in its application position subsequent to attainment of the five pound quick service reduction in brake pipe pressure to attain an even greater degree of reduction in pressure in the brake pipe for effecting a greater degree of brake application on the various cars of the train.

In the latter case, each respective service valve device 88 on the various cars of the train, once having assumed its application position, will remain therein for continuation of supply of fluid under pressure from the supply reservoir to the brake cylinder device 5 until the brake cylinder pressure as experienced in the chamber 201 in said service valve device 88 corresponds with the further degree of reduction in brake pipe pressure as experienced in the brake pipe pressure chamber 185, at which time the diaphragm stack of said service valve device 88 will return to its lap position, for holding such brake cylinder pressure in the brake cylinder device, as previously described. If the brake pipe pressure on any particular car is reduced to zero as a result of movement of the brake valve device on the locomotive to its emergency position, for example, the service valve device 88 on such car will remain in its application position, with the brake cylinder supply valve 154 unseated and the supply reservoir 3 thereby connected to the brake cylinder device, without returning to its lap position, as fluid under pressure in the supply reservoir equalizes with that in the brake cylinder device at such as fifty-five pounds; a brake cylinder pressure which otherwise could be obtained by a twenty pound reduction in brake pipe pressure with consequent return of the service valve device 88 to its lap position, as will be appreciated from the previous description.

In the release position of the diaphragm stack of the service valve device 88, in which position said stack is shown in the drawing, and in the normal application and lap positions of said diaphragm stack as previously described, the charging groove 161 of the slide valve 156 will remain in registry with the passageway 77 in addition to the respective branch of the brake pipe passageway 12 to maintain communication between chamber 185 and the brake pipe 4 by way of said groove and the passageways 12 and 77 to enable the service valve device 88 to respond to changes in brake pipe pressure which may be effected at the time said service valve device is in such positions, as well as to enable a recharge of the supply reservoir 3 by way of the supply reservoir charging check valve device 94, as previously described, at any time that such pressure as realized in said passageway 77 and in chamber 273 in said supply reservoir charging check valve device preponderates over supply reservoir pressure as realized in the chamber 274 in said check valve device sufficiently to overcome opposition of the spring 271, or namely to the extent of one and seven-tenths pounds, for maintaining the check valve 270 in said device 94 unseated for admitting such recharge.

However, if at the time that the service valve device 88 assumes its application position in response to a reduction in brake pipe pressure as experienced in its brake pipe pressure chamber 185 by way of the passageway 77 and groove 161 in its slide valve 156, fluid under pressure happens to be leaking from the brake cylinder device 5 at an excessive rate due, for example, to such as a faulty brake cylinder packing cup, the brake cylinder pressure may fail to build up as a result of supply of supply reservoir fluid thereto by way of the unseated brake cylinder supply control valve 154, in which event, the reduction in brake pipe pressure in said chamber 185 will permit the pressure of control reservoir fluid bottled up in chamber 186 to move the diaphragm stack, including the slide valve 156, upwardly, as viewed in the drawing, against opposition of the springs 155 and 202 to a position in which the brake cylinder supply passageway 72 is blanked off from chamber 157 and hence cut off from the supply reservoir 3 via the unseated brake cylinder supply control valve 154, and in which position the charging groove 161 is out of registry with the reservoir charging passageway 77.

The closure of the brake cylinder supply passageway 72 to the chamber 157 by the slide valve 156 in the service valve device 88 as above described, prevents an unnecessary loss in fluid under pressure from the supply reservoir 3 to such as a leaky brake cylinder device 5 by way of the unseated brake cylinder supply control valve 154 in said device 88 and, in addition, the disestablishment of registry of the groove 161 in slide valve 156 with passageway 77, prevents bleed down of fluid under pressure from the brake pipe 4 on the train, hence prevents loss of control of the brakes on such train, which would otherwise occur by flow of fluid under pressure from the respective section of the brake pipe 4 on the car possessing faulty brake cylinder device, by way of the brake pipe passageway 12, said groove 161, said passageway 77, the supply reservoir charging check valve device 94, the supply reservoir passageway 68, the chamber 153 in said device 88, the unseated brake cylinder supply control valve 154, annular chamber 157, the brake cylinder passageway 72, groove 116 in valve 98 in service selector valve device 86, passageway 24 and/or 25, choke 26 or/and 27, passageway 19, pipe 20, and the faulty brake cylinder device 5 subjected to conditions of excessive leakage of fluid under pressure therefrom. In addition, the disestablishment of registry of the groove 161 with the passageway 77 as above described, also the results in disestablishments of communication of the brake pipe pressure chamber 185 in the service valve device 88 with the brake pipe passageway 12, hence with the brake pipe 4, and prevents a subsequent increase in brake pipe pressure to its normal full charge value for effecting release of the brakes from returning the service valve device 88 to its release position in which it is shown in the drawing, and thereby continues to isolate the brake equipment on the car with the leaky brake cylinder device from the brake pipe.

In the case where the diaphragm stack of the service valve device 88 has been caused to assume its brake cylinder cut-off position in which the brake pipe pressure chamber 185 is isolated from the brake pipe 4, and hence will not respond to variations of fluid under pressure therein, upon repair of the respective brake cylinder device 5 to correct the faulty leakage condition, for example, reestablishment of communication of the brake pipe pressure chamber 185 in the service valve device 88 with the brake pipe 4 on that particular car may be attained by operation of the control and supply reservoir release valve device 47, as previously described, to vent fluid under pressure from the control reservoir 2, hence from the chamber 186 in said service valve device 88, to reduce the pressure of control reservoir fluid to substantially that of the atmosphere, whereupon, the spring 202 in the brake cylinder pressure chamber 201 in the service valve device 88 will effect movement of the diaphragm stack to its release position in which it is shown in the drawing. Upon return of the control and supply reservoir release valve device 47 to its normal position in which it is shown in the drawing to close off venting communication of the control reservoir with atmosphere, the control reservoir 2 will be recharged with fluid under pressure from the brake pipe 4 on that particular car in the same manner as described previously in connection with initial charging of said control reservoir.

On any particular car of the train, during the effecting and holding of a brake application by operation of the respective brake controlling valve device 1 on that car in response to reduction in pressure of fluid in the brake pipe 4 below its normal full charge value as previously described, by virtue of the displacement volume of the respective brake cylinder device 5 relative to volume of the supply reservoir 3, the normal reduction in supply reservoir pressure resultant from supply of fluid under pressure to the brake cylinder device during such application will be less than the reduction in brake pipe pressure necessary to effect such application; for example, a six pound reduction in brake pipe pressure below its normal full charge pressure will result in a twelve pound brake cylinder pressure and slightly less than a six pound reduction in supply reservoir pressure, while a twenty pound or greater reduction in brake pipe pressure will result in a fifty-five pound brake cylinder pressure and a reduction in supply reservoir pressure of approximately sixteen pounds for equalization at fifty-five pounds with the pressure in the brake cylinder device. It will be apparent, therefore, that during normal operation of the brake controlling valve device 1 on any particular car, that even though groove 161 in the slide valve 156 of the respective service valve device 88 on that car is in registry with both the brake pipe passageway 12 and the passageway 77 when the diaphragm stack of said service valve device is in its application position for supplying fluid under pressure to the respective brake cylinder device or in its lap position for holding the desired pressure of fluid in said brake cylinder device, the supply reservoir 3 will not normally be recharged with fluid under pressure from the brake pipe by way of said passageway 12 and the supply reservoir charging check valve device 94 as previously described, unless there is leakage of fluid under pressure from the system, until the pressure of fluid in said brake pipe passageway 12 is increased to a value in excess of that in supply reservoir as experienced at the output side of said check valve device.

Correspondingly, the quick service valve device 87, under influence of the preponderance of auxiliary reservoir pressure in its chamber 133 over the brake pipe pressure in its chamber 132, will normally remain in its quick service position, maintaining communication between the brake pipe 4 and the quick service passageway 16, during initiation and holding of a brake application.

According to a feature of the invention, if the subject brake equipment is employed in a train on which the brake rigging between the brake cylinder device 5 and the brake shoes on each car is of a sufficient leverage ratio that a braking effect may be obtained on the cars at the brake cylinder inshot pressure of nine pounds, for example, corresponding to the five pound quick service reduction in brake pipe pressure, then slight variations in the degree of brake application may be obtained for light brake applications of the train on the level or on slight down grades, between the limits of the degree corresponding to the nine pound brake cylinder pressure and a full release corresponding to a reduction in brake cylinder pressure to that of the atmosphere, without causing return of the charging valve device 90 to its charging position in which it is shown in the drawing, and without causing any quick service brake pipe reducing activity.

Such variations in brake cylinder pressure between its inshot pressure of nine pounds, for example, and atmospheric pressure may be effected in the following manner. For example, with the pressure of fluid in the brake pipe 4 at its quick service value of five pounds below its normal charge value of seventy-one pounds chosen as example, or namely sixty-six pounds, and the brake cylinder pressure at its inshot value of nine pounds corresponding to the reduced brake pipe pressure, pressure of fluid in the brake cylinder device 5 may be reduced to atmospheric pressure for full release of the brakes by effecting an increase in brake pipe pressure from sixty-six pounds to within three pounds of its normal charge value of seventy-one pounds, or namely to sixty-eight pounds, whereupon, such increase in brake pipe pressure to within three pounds of its normal full charge value as experienced in the brake pipe pressure chamber 185 of the service valve device 88 by way of the passageway 77, groove 161 in the slide valve 156, and the brake pipe passageway 12, together with spring 202 and brake cylinder pressure in chamber 201 will move the diaphragm stack in said service valve device 88 from its lap position in which the slide valve 156 is in engagement with the seated brake cylinder supply control valve 154 to its brake cylinder release position in which it is shown in the drawing defined by engagement of the follower member 182 with the annular spring follower element 195 held seated by the spring 192 in engagement with the stop shoulder 197 of the fixed annular stop element 198. Fluid under pressure will then be released from the brake cylinder device 5 by way of the pipe 20, passageway 19, the choke 26 and passageway 24, and/or the choke 27 and the passageway 25, according to position of service selector valve 98, the brake cylinder passageway 72, the annular chamber 157 in the service valve device 88, the brake cylinder release passageway 158, ports 159, and groove 160 in the slide valve 156 of said service valve device 88, the exhaust passageways 70 and 71, etc., to the atmosphere until the brake cylinder pressure is thus reduced to that of the atmosphere.

Upon the initiation in the increase in brake pipe pressure from its value of five pounds below its normal full charge value to within three pounds of said normal charge value, the brake pipe pressure as experienced in the brake pipe pressure chamber 132 in the quick service valve device 87 will be thus increased to within seven-tenths of a pound of the supply reservoir pressure as realized in the chamber 133 in said quick service valve device, whereupon the spring 134 in said chamber 132 will effect movement of the diaphragm assemblage including follower members 125 and 128 in the direction of said chamber 133 to a quick service cut-off position defined by engagement of the stud 126 with the stop surface 138 in the cap member 137. In such position of the diaphragm assemblage, the attached slide valve 124 will be in the position in which it is shown in the drawing blanking off the quick service passageway 16 to the groove 141 in said slide valve 124 and hence to the chamber 132, and thereby to the brake pipe passageway 12. Fluid in the quick service volume chamber 15 in the pipe bracket portion 6 and in the quick service volume pressure chamber 257 in the interlock valve device 91 connected to the quick service passageway 16 thus will be bottled up at the quick service valve device 87 at a pressure existent in the brake pipe at the time said quick service valve device assumes its cut-off position, or namely at a pressure of about four or four and one-half pounds, for example, below the normal full charge value of the brake pipe.

As the pressure of fluid in the brake pipe pressure chamber 248 increases with that in the brake pipe 4 as aforedescribed to within three pounds of its normal full charge value, hence to within three pounds of the pressure of fluid in the control reservoir pressure chamber 252, such increased pressure in chamber 248, in assist by the spring 255 and by pressure of fluid in the chamber 257 acting on the lowermost end of the valve 245, will effect movement of the diaphragm assemblage including said valve 245 in the direction of said control reservoir pressure chamber 252 until the groove 259 in said slide valve is brought into registry with the port end of the brake cylinder passageway 73 while the groove 260 in said slide valve remains in registry with the supply reservoir passageway 68 and with the charging valve control passageway 79 to maintain the control chamber 238 in the charging valve device 90 pressurized for holding the charging valve in its lowermost or charging cut-off position previously described.

Upon establishment of registry of the groove 259 in slide valve 245 with the brake cylinder passageway 73, fluid under pressure will be released from the quick service volume chamber 15 by way of the passageway 16, the chamber 257 in the interlock valve device 91, the central passageway 258 and groove 259 in the slide valve 245 of said interlock valve device, said passageway 73, the choke 80, the brake cylinder passageway 72, the annular chamber 157 in the service valve device 88, the brake cylinder release passageway 158, the ports 159, and the groove 160 in the slide valve 156 of said device 88, and the exhaust passageways 70 and 71, etc.

Upon release of fluid under pressure from the quick service volume chamber 15 as above, the brake controlling valve device 1 is conditioned to enable a quick service reduction in brake pipe pressure to be effected in response to a subsequent reduction in pressure of fluid therein to the extent necessary to cause the quick service valve device 87 to move to its quick service position, as previously described.

At the same time, along with the fluid under pressure in the quick service volume chamber 15, the pressure of fluid in the chamber 257 in the interlock valve device 91 is thereby reduced to that of the atmosphere by virtue of establishment of registry of the groove 259 with the passageway 73 as above-described, while the groove 260 remains in communication with the charging valve control passageway 79 to maintain the device 90 in its cut-off position. Such reduction in pressure in the chamber 257 results in the disappearance of the bias action of pressure of fluid in said chamber on the valve 245 previously acting in assistance with pressure of fluid in chamber 248 in opposition to the pressure of fluid in control reservoir pressure chamber 252, and immediately establishes an equilibrium condition of said valve and attached diaphragm assemblage which maintains said valve and assemblage disposed in the previously-described intermediate position.

It will be apparent from the foregoing that, if, during existence of the brake cylinder inshot pressure of such as nine pounds, with the brake pipe pressure at its corresponding value of such as five pounds below its normal full charge value, the pressure of fluid in the brake pipe is increased to a value greater than three pounds below its normal full charge value, such as to within four pounds of its normal full charge value, the resultant increase in brake pipe pressure will cause the service valve device 88 to respond to such increase in brake pipe pressure as realized in its brake pipe pressure chamber 185 to move from its lap position to its release position, in which it is shown in the drawing, for venting fluid under pressure from the brake cylinder device 5 by way of the brake cylinder release passageway 158 in the slide valve 156 of said device 88 as previously described, and thereafter to return to its lap position in engagement with the brake cylinder supply control valve 154 for closing off said passageway 158 from the brake cylinder device by way of the passageway 72 when the brake cylinder pressure as realized in the brake cylinder pressure chamber 201 in said service valve device 88 reduces to the required degree commensurate with the degree of increase in brake pipe pressure in the chamber 185. Under such circumstances, when the interlock valve device 91 responds to assume its intermediate position, the fluid under pressure in the quick service volume chamber 15 and in chamber 257 will be to all intents and purposes completely released, being limited to the extent of equalization with a brake cylinder pressure of about six pounds. A subsequent reduction in brake pipe pressure calling for an increase in degree of brake application, only if sufficient to overcome opposition of the seven-tenths pound bias of spring 134 in quick service valve device 87 and the one and seven-tenths pound differential in pressures between chambers 132 and 133 therein, will cause said quick service valve device 87 to move to its quick service position for establishing communication between the brake pipe passageway 12 and the quick service valve passageway 16 to effect the quick service reduction in brake pipe pressure as previously described.

From the foregoing, it will be appreciated that on cars on which the brake rigging interposed between the respective brake cylinder devices and the brake shoes is of sufficient leverage ratio for realization of braking action on such car when the brake cylinder pressure is at a valve such as its inshot value of nine pounds, for example, at the corresponding reduced brake pipe pressure of five pounds below its normal full charge value, slight variations in the degree of brake application, including full release of the brakes, may be effected by variations in degree of brake pipe pressure between the limits of five pounds below normal full charge value and three pounds below normal full charge value without permitting return of the charging valve device 90 to its charging position in which it is shown in the drawing and without causing the quick service valve device to go to its quick service position.

At the same time, when the brake cylinder pressure is thus caused to reduce below its inshot value of nine pounds, for example, corresponding to the quick service reduction in brake pipe pressure of five pounds below its normal full charge value of seventy-one pounds, for example, such reduced brake cylinder pressure as realized in the brake cylinder pressure chamber 300 in the brake cylinder inshot valve device 96 by way of the pipe 20, passageway 19, stabilizing choke 23, brake cylinder passageway 22, brake cylinder pressure chamber 298, and the ports 299 in said inshot valve device, will permit the spring 307 in the non-pressure chamber 308 to deflect the diaphragm 302 and move the attached stem 292 in the direction of the chamber 283 to unseat the poppet type valve 287 against opposition of the spring 291. Thus the annular chamber 295 will become open to the chamber 283 in the brake cylinder inshot valve device 96 by way of the ports 296, the interior of the seat element 289 and the unseated poppet valve 287 to permit the supply and release of fluid under pressure to and from the brake cylinder device in by-pass of the brake cylinder application choke 26 or/and choke 27 without restriction by way of passageway 72, chambers 283 and 295 in the brake cylinder inshot valve device 96, the brake cylinder passageway 21 in the main casing portion 6, the brake cylinder passageway 19 in the pipe bracket portion 6, and the pipe 20.

Even when the subject brake equipment is employed on trains where the leverage ratio of the brake rigging interposed between the brake cylinder devices 5 and the brake shoes on the cars are not such that will avail any effective degree of brake application when the brake cylinder pressure is merely at its inshot value of nine pounds, for example, the novel feature of the subject brake apparatus whereby a full release of the brakes may be effected without causing return of the charging valve device 92 to its charging position may be employed to advantage to prevent equalization of the control reservoir 2 on each car with that in the brake pipe on such car, which equalization would otherwise occur by way of the control reservoir passageway 28, the groove 243 in the slide valve 232 of the charging valve device 90, the passageway 76, the control reservoir overcharge check valve device 93, the passageway 77, the groove 161 in the slide valve 156 of the service valve device 88, the brake pipe passageway 12, etc., if such charging valve device 90 were permitted to assume its charging position in which it is shown in the drawing when the brake pipe pressure is caused to increase to within several pounds of its normal full charge value.

During release of the brakes in response to an increase in brake pipe pressure, whenever the pressure of fluid in the brake pipe as realized in the inlet chamber 273 in the supply reservoir charging check valve device 94 exceeds the supply reservoir pressure as realized in the output chamber 274 of said charging check valve device to the extent of one and seven-tenths pounds the supply reservoir 3 will be charged to within one and seven-tenths pounds of the brake pipe by way of the brake pipe passageway 12, the groove 161 in the slide valve 156 of the service valve device 88, the passageway 77, said chamber 273, the check valve 270 unseated against opposition by the spring 271, said outlet chamber 274, the passageway 68, and the pipe 69. Such recharging of the supply reservoir will occur by way of the supply reservoir charging check valve device 94 so long as the brake pipe pressure in passageway 77 remains in the necessary degree of preponderance over auxiliary reservoir pressure sufficient to unseat the check valve 270, and it will be appreciated that, if the increase in pressure of fluid in the brake pipe 4 for effecting release of the brakes is limited to within three pounds of its normal full charge value of seventy-one pounds chosen for example, namely sixty-eight pounds, to hold, as described previously, the charging valve device 90 in its cut-off position, then the supply reservoir will be charged to within one and seven-tenths pounds of the brake pipe pressure of sixty-eight pounds, or, approximately sixty-six and three-tenths pounds. Such sixty-six and three-tenths pounds charge pressure in the supply reservoir 3, corresponding to a limited full charge pressure of sixty-eight pounds in the brake pipe, will not, however, materially affect the maximum brake cylinder pressure which may be realized in the brake cylinder device 5 as a result of subsequent reduction in brake pipe pressure calling for a maximum brake cylinder pressure, as equalization of the brake cylinder pressure with the supply reservoir will occur only at the one or two pounds below the equalization pressure which otherwise attains where the supply reservoir is charged to a full normal value of seventy-one pounds.

From the foregoing it should be apparent that during existence of any degree of brake application at a corresponding brake cylinder pressure, a full release of the brakes on any particular car may be effected with a reduction in brake cylinder pressure to that of the atmosphere by increasing the pressure of fluid in the brake pipe 4 up to three pounds below its chosen normal full charge value of seventy-one pounds, or namely to sixty-eight pounds, without permitting the charging valve device 90 to return to its charging position in which it is shown in the drawing, and, therefore, without permitting any recharge of the control reservoir 2, pressure of fluid in which will remain fixed. However, when desired, in addition to effecting a full release of the brakes with reduction in brake cylinder pressure to that of the atmosphere, a recharging of the control reservoir to make up for any slight reduction in pressure of fluid therein which might occur as a result of leakage, for example, may be effected by increasing the brake pipe pressure to its full normal value of seventy-one pounds. In response to such additional pressurization of the brake pipe to its full normal charge value of seventy-one pounds, such additional increase in brake pipe pressure will be realized in brake pipe pressure chamber 248 in the interlock valve device 91 by way of the passageway 77, the groove 161 in the slide valve 156 of the service valve device 88, the brake pipe passageway 12, and etc., and such increased pressure in the chamber 248 in acting on the diaphragm 250 in assist by the spring 255 in said interlock valve device will effect movement of the slide valve 245, through the medium of follower member 249, from its intermediate position previously described to the position in which it is shown in the drawing defined by engagement by the stud 254 with the stop surface 256 formed in cap member 152. During such movement of the slide valve 245 in the interlock valve device 91 from its intermediate position to the position in which it is shown in the drawing, the groove 260 constantly connected to the supply reservoir passageway 68 will be carried out of registry with the charging valve control passageway 79 which in turn becomes uncovered to the quick service volume pressure chamber 257, while the groove 259 in said slide valve 245 remains in registry with the brake cylinder passageway 73.

At the time that the charging valve control passageway 79 thus becomes open to the chamber 257 in the interlock valve device 91, pressure of fluid in the brake cylinder device 5 will have been reduced substantially to atmospheric pressure by way of the pipe 20, the passageway 21, chambers 295 and 283 and the unseated valve 287 in the brake cylinder inshot valve device 96, the passageway 72, the chamber 157 in the service valve device 88, the brake cylinder release passageway 158, ports 159, and groove 160 in the slide valve 156 of the service valve device 88, the exhaust passageway 71 and/or exhaust passageway 70, etc. Therefore, when the charging valve control passageway 79 becomes connected to the quick service volume pressure chamber 257 in the interlock valve device 91, fluid under pressure will release from the control chamber 238 in said charging valve device 90 by way of said passageway 79, said chamber 257 in the interlock valve device 91, the central passageway 258 and the groove 259 in slide valve 245 in said interlock valve device 91, the brake cylinder passageway 73, the quick service regulating control choke 80, the brake cylinder passageway 72, etc. as previously traced.

Such release of fluid under pressure from the chamber 238 will permit return of the charging valve device 90 to its charging position in which it is shown in the drawing and allow for make-up of any deficiency in control reservoir pressure below its normal full charge value of seventy-one pounds, by flow of fluid under pressure from the brake pipe by way of the brake pipe passageway 12, the groove 161 in the slide valve 156 of the service valve device 88, the passageway 77, the control reservoir slow charging control choke 84, the chamber 268 in the control reservoir overcharge check valve device 93, the passageway 76, the groove 243 in the slide valve 232 of the charging valve device 90, the control reservoir passageway 28, and the pipe 27.

At the same time, upon return of the charging valve device 90 to its charging position in which it is shown in the drawing as a result of the increase in brake pipe pressure during release of the brakes to its normal full charge value of seventy-one pounds, for example, the pressure of fluid in the supply reservoir 3, shy of the pressure of fluid in the brake pipe by such as one and seven-tenths pounds by virtue of the action of the supply reservoir charging check valve device 94, will be made up when equalization of pressures between that in supply reservoir 3 and that in the brake pipe 4 occurs by way of the brake pipe passageway 12, the charging groove 161 in the slide valve 156 of the service valve device 88, the passageway 77, the supply reservoir slow charging control choke 85, the chamber 278 in the supply reservoir overcharge check valve device 95, the passageway 78, the groove 244 in the slide valve 232 of the charging valve device 90, supply reservoir passageway 68, and the pipe 69.

According to another feature of the invention, when, during the effecting of release of the brakes on a train, pressure of fluid in the brake pipe 4 is increased at the locomotive at a relatively rapid rate and to a considerable degree such as up to its normal full charge value of seventy-one pounds, for example, or in excess thereof up to full main reservoir pressure of such as one hundred and twenty pounds, for example, to effect a rapid and full release of the brakes throughout the train, such relatively rapid increase in brake pipe pressure as experienced in the brake pipe passageway 12 in each of the respective brake controlling valve devices on the first, perhaps fifteen, cars in the train, will cause a flow of fluid under pressure from the brake pipe 4 on such cars to the brake pipe pressure chamber 185 in the service valve device 88 in each of the brake controlling valve devices 1 on such cars by way of said passageway 12, the groove 161 in a slide valve 156 of said service valve device, passageway 77, and stabilizing choke 81, where the pressure of fluid in said chamber 185 is momentarily caused to increase at a rapid rate corresponding to the rapid increase in pressure in the brake pipe 4 on such cars.

In each of the brake controlling valve devices 1 on such first cars of the train, such rapid build-up in pressure in the brake pipe pressure chamber 185 in the respective service valve device 88 acting on the diaphragm 184 against opposition of the control reservoir pressure and spring 192 in the control reservoir pressure chamber 186 and in assist by the pressure of fluid and spring 202 in the brake cylinder pressure chamber 201 acting on the diaphragm 166 will effect rapid movement of the diaphragm stack from its lap position to a retarded recharge and release position in the direction of said chamber 186 by unseating spring follower element 195 from the fixed stop element 198 and thereby cause the slide valve 156 to leave engagement with the brake cylinder supply control valve 154 for opening the annular passageway 157 to the central brake cylinder release pasageway 158 in said slide valve, to close the brake cylinder exhaust passageway 70 from the groove 160, and to close the brake pipe passageway 12 to the groove 161.

In such retarded release and recharge position of the diaphragm stack in the service valve device 88 of the brake controlling valve device on the first cars of the train, fluid under pressure will be released from the respective brake cylinder device 5 on each of such cars by way of the respective pipe 20, the passageway 19, the application control choke 26 and passageway 24, and/or the application control choke 27 and passageway 25, according to position of the service selector valve device 86, groove 116 in the slide valve 98 of said service selector valve device, the brake cylinder passageway 72, the annular passageway 157 in service valve device 88, the brake cylinder release passageway 158, the ports 159 and the groove 160 in the slide valve 156 of said service valve device 88, the exhaust passageway 71, the groove 115 in the slide valve 98 of the service selector valve device 86, the exhaust passageway 33 and choke 37, or/and the exhaust passageway 34 and choke 38, according to position of said slide valve 98, and the exhaust passageway 30 to the atmosphere. It will be apparent, since such release of fluid under pressure from the respective brake cylinder devices on the first cars in the train occurs by way of the respective exhaust passageway 71 and associated chokes in the respective brake controlling valve devices 1 on such cars to the exclusion of the respective exhaust passageways 70 and associated chokes, that the rate of reduction in pressure in the respective brake cylinder device 5 on each of such cars will be less than that which would otherwise prevail where release of fluid under pressure therefrom occurs by way of both the exhaust passageway 71 as well as the exhaust passageway 70.

In each of the respective brake controlling valve devices 1 on the first cars of the train, the pressure of fluid in the passageway 77, cut off from the brake pipe passageway 12 by the slide valve 156 of the service valve device 88 in its retarded release and recharge position, in all probability will be less than supply reservoir pressure at the time that said service valve device assumed such retarded release and recharge position described above, so that, momentarily at least, there will be no recharge of the supply reservoir 3 on any one of the first cars by way of the supply reservoir charging check valve device 94, or no recharging of either the supply reservoirs 3 or the control reservoirs 2 on any of such cars by way of the slow charging control chokes 85 and 84, respectively, since the passageways 78 and 76, respectively, are cut off from the supply reservoir and control reservoir passageways 68 and 28, respectively, by the slide valve 232 in charging valve device 90 in its lowermost position, as viewed in the drawing. It will be apparent, therefore, that the respective brake controlling valve devices 1 on the first cars of the train, under influence of a rapid increase in pressure in the brake pipe 4 thereon, will initially respond to effect a retarded release of fluid under pressure from the respective brake cylinder devices on such cars as controlled by the brake cylinder release choke 37 or/and 38 associated with the exhaust passageway 71 on each of said brake controlling valve devices, preventing recharge of the supply or control reservoirs 3 and 2 on these cars which otherwise might reduce the rate of build-up in brake pipe pressure on the following cars of the train.

In each of the respective brake controlling valve devices on the first cars of the train due to reduction in brake cylinder pressure in the brake cylinder pressure chamber 201 of the respective service valve device 88 occurring at a retarded rate controlled by the brake cylinder release chokes 37 or/and 38, associated with the exhaust passageway 71, will establish a preponderance in forces acting on the diaphragm stack in the service valve device 88 in favor of the action of the control reservoir pressure and of the spring 192 in the control reservoir pressure chamber 186 in the diaphragm assemblage including the diaphragm 184 sufficient to cause movement of said stack and associated slide valve 156, upwardly as viewed in the drawing. Such upward movement of slide valve 156 will cause groove 161 in said slide valve 156 to be uncovered to the brake pipe passageway 12 without opening the groove 160 to the exhaust passageway 70, whereupon fluid under pressure from the brake pipe passageway 12 will flow by way of said groove 161 into the passageway 77, thence to the brake pipe pressure chamber 185 in the service valve device 88 and to the inlet chamber 273 to the supply reservoir charging check valve device 94.

When the degree of brake pipe pressure, as on the first cars of the train where such pressure is increasing at a relatively rapid rate for a rapid full release of the brakes throughout the train, as previously mentioned, is capable of causing supply of fluid under pressure from the brake pipe 4 by way of the respective brake pipe passageway 12 on each of the brake controlling valve devices 1 on such cars to the passageway 77 at a rate which, if experienced in the brake pipe pressure chamber 185 in the respective service valve device 88 would, in acting on the diaphragm stack therein, preponderate over any rate of reduction in brake cylinder pressure which could transpire and would be experienced in the brake cylinder pressure chamber 201 in said service valve 88, then when the slide valve 156 moves upwardly, as viewed in the drawing, to establish registry between its groove 161 in the brake pipe passageway without uncovering the exhaust passageway 70 to the groove 160 as described in the preceding paragraph, then the pressure head existent in the brake pipe passageway 12 will cause sufficient flow of fluid under pressure from same to the passageway 77 by way of the groove 161 in the slide valve 156 to charge the respective auxiliary reservoir 3 by way of the supply reservoir charging check valve device 94, in manner as previously described, and, by way of the stabilizing choke 81, to build up the pressure of fluid in the brake pipe pressure chamber 185 in the diaphragm stack of the service valve device at such a rate as will tend to override the effect of the reduction in brake cylinder pressure occurring in the chamber 201 in said stack at a controlled rate by way of the groove 160 in said slide valve and the exhaust passageway 71 at exclusion of exhaust passageway 70. Under such conditions the diaphragm stack will be, in effect, under control of brake cylinder pressure in its chamber 201 and will respond to any momentary tendency or any momentary slight overriding effect of pressure of fluid in the brake pipe pressure chamber 185 to move in the direction of the control reservoir pressure chamber 186 against opposition of the retarded recharge control spring 192 and partially close the respective brake pipe passageway 12 to the groove 161 to automatically regulate admittance of fluid under pressure from said passageway 12 to the passageway 77 for maintaining such rate of supply to said passageway 77, hence to the supply reservoir 3 by way of the supply reservoir charging check valve device 94, at a retarded rate corresponding to the retarded rate of release of fluid under pressure from the brake cylinder device 5 by way of the exhaust passageway 71, choke 37 and/or 38, as the case may be, associated therewith.

During such automatic regulation of supply of fluid under pressure to the passageway 77 from the brake pipe passageway 12 by way of the groove 161 in the slide valve 156 in the diaphragm stack of the respective service valve device 88, obviously, since the pressure of fluid in the brake cylinder device 5 is decreasing, the rate at which brake cylinder pressure will continue to decrease until it is reduced, for example, to atmospheric pressure for full release of the brakes, will correspondingly reduce, and, in response to such reduction in the rate of release or rate of reduction in brake cylinder pressure as experienced in the chamber 201 in said service valve device in acting on the diaphragm stack thereof, at any given moment and degree of opening of brake pipe passageway 12 to the groove 161, will tend to cause the rate of buildup in brake pipe pressure in the chamber 185 in said service valve device to get ahead of the rate of reduction in brake cylinder pressure in said chamber 201, whereupon the diaphragm stack will automatically move, perhaps in a series of continued steps at regular small intervals of time, to successively, more completely close off the brake pipe passageway 12 to the groove 161 in slide valve 156 to automatically maintain accord between the rate of increase in pressure of fluid in the passageway 77 and the changing rate of reduction in brake cylinder pressure in the chamber 201 of said service valve device.

Thus it will be appreciated from the foregoing remarks that, according to a feature of the invention, where the respective brake controlling valve devices 1, such as on the first cars of the train, are subjected to a relatively rapid build-up in brake cylinder pressure to an excessive degree for effecting a rapid and perhaps complete release of the brakes throughout the train, the respective service valve devices 88 in each of the said brake controlling valve devices will respond automatically to retard the rate of release of brake cylinder pressure on such cars as well as to retard the rate of recharging of the supply reservoirs 3 thereon, and thereby will conserve the utilization of fluid under pressure from the brake pipe on such cars as will aid in building up brake pipe pressure on the following cars of the train for effecting release of the brakes thereon.

During such rapid pressurization of the brake pipe at the locomotive to effect such as a full release, for example, of the brakes on the train, relative to the rate of increase in brake pipe pressure on the front cars of the train, the rate of increase in brake pipe pressure on the following cars of the train will successively diminish toward the rear thereof.

According to the retarded release and recharge feature associated with the service valve devices 88 in the respective brake controlling valve devices on the various cars of the train, however, the rate of release of the brakes on each of such cars will tend to be equalized irrespective of the variation in the rate of increase in brake pipe pressure on such cars.

For example, in cars intermediate opposite ends of the trains the rate of increase in brake pipe pressure as experienced in the brake pipe pressure passageway 12 in each respective brake controlling valve device 1 thereon, in initially causing flow of fluid under pressure to the respective brake pipe pressure chamber 185 in the service valve device 88 by way of the groove 161 in the slide valve 156 thereof and the passageway 77, may be such as will cause movement of the diaphragm stack including said slide valve out of its lap position in engagement with the respective brake cylinder supply control valve 154 to permit release of fluid under pressure from the respective brake cylinder device 5 on each of such cars by way of the brake cylinder passageway 72 etc., as previously traced, the annular passageway 157, brake cylinder release passageway 158, ports 159, and the groove 160 in the respective service valve device 88, and to partially close the exhaust passageway 70 to said groove 160 and automatically regulate the rate of brake cylinder release on such cars according to the rate of reduction in brake cylinder pressure experienced in the brake cylinder pressure chamber 201 in the service valve device 88 of each of the respective brake controlling valve devices, while the groove 161 in the slide valve 156 thereof remains fully open to the brake pipe passageway 12 as fluid under pressure is caused to flow thereby from the brake pipe to the respective passageway 77, thence to the brake pipe pressure chamber 185 in said service valve device, and to the respective supply reservoir 3 by way of the supply reservoir charging check valve device 94.

Whereas, initially at least, it may be the case that, on the cars toward the rear of the train, the rate of increase in brake pipe pressure as experienced in the brake pipe passageway 12 in each of the brake controlling valve devices 1 on such cars may be such that the rate of reduction in brake pipe pressure as experienced in the chamber 185 in each of the service valve devices 88 of said brake controlling valve devices in acting on the diaphragm stack therein will have a lesser effect on said stack than the effect of brake cylinder pressure in chamber 201 thereon resultant from release of fluid under pressure from the respective brake cylinder device 5 by way of both the exhaust passageways 70 and 71 upon unseating of the slide valve 156 from the brake cylinder supply control valve 154, so that, as will be appreciated from the previous description, as the rate of reduction in brake cylinder pressure experienced in the chamber 201 tends to exceed the corresponding rate of reduction of brake pipe pressure in the chamber 185, said stack will automatically respond to assume positions at varying degrees of proximity with the said brake cylinder supply control valve 154, thereby to automatically regulate the rate of release of fluid under pressure from the brake cylinder device by way of the brake cylinder release passageway 158 in said slide valve to bring such rate of release into accord with the rate of increase in brake pipe pressure being experienced in the brake pipe pressure chamber 185.

If, on any particular car on the train, subsequent to realization of a full release of the brakes thereon, with pressure of fluid in the brake cylinder pressure chamber 201 in the diaphragm stack of the respective service valve device 88 reduced to substantially that of the atmosphere; with brake pipe pressure in the chamber 185 at its normal full charge value of such as seventy-one pounds, for example; and with pressure of fluid in the control reservoir pressure chamber 186 at the same value; the service valve device 88 will return to the position in which it is shown in the drawing defined by engagement of the diaphragm follower member 182 with the spring follower element 195 while same is held seated by the spring 192 against shoulder 197 of stop element 198.

If, on any particular car of the train, after the components of the respective brake controlling valve device 1 have returned to the positions in which they are shown in the drawing as previously described, and after the control and supply reservoirs have been charged to their normal full charge value of such as seventy-one pounds, for example, the pressure of fluid in the respective section of brake pipe 4 responsible for such full release of the brakes is in excess of its full normal charge value of seventy-one pounds, for example, such as at a main reservoir pressure of one hundred and twenty pounds, for example, as is sometimes employed as previously mentioned to effect a rapid full release of the brakes throughout the train, then, in each of said brake controlling valve devices, fluid under pressure from the brake pipe passageway 12 connected to said respective section of brake pipe 4 will continue to flow by way of the groove 161 in the slide valve 156 of the respective service valve device 88 to the passageway 77, thence to the brake pipe pressure chamber 185 in said service valve device, and to the auxiliary and control reservoirs 3 and 2, respectively, by way of the slow charging control chokes 85 and 84, respectively, passageways 78, 76, respectively, grooves 244 and 243, respectively, in slide valve 232 of the charging valve device 90, passageways 68 and 28, respectively, and pipes 69 and 29, respectively, as previously described in connection with initial charging, whereby such reservoirs will tend to become overcharged above their normal full charge value at a relatively slow rate, also as previously described in connection with initial charging, and whereupon the diaphragm stack in the respective service valve device 88 will automatically respond to any tendency of the brake pipe pressure as experienced in its chamber 185 to exceed the slowly increasing control reservoir pressure in its chamber 186 to an extent greater than seven-tenths of a pound to move to its retarded recharge position by unseating the spring follower element 195 from stop element 198 against opposition of the spring 192 for partially closing the brake pipe passageway 12 to the groove 161 and thus automatically maintain accord of the brake pipe pressure in its chamber 185 with control reservoir pressure in its chamber 186. Subsequently, as previously described in connection with initial charging of the equipment, upon return of the brake pipe pressure from its overcharge value to its normal full charge value, in the brake controlling valve device 1 on any particular car, dissipation of the overcharge in the control and supply reservoirs 2 and 3 will be dissipated by way of the control and supply reservoir overcharge check valve devices 93 and 95, respectively.

Having now described the invention, what we claim as new and desire to secure by Letters Patent, is:

1. In a fluid pressure brake apparatus, in combination, a normally charged brake pipe, a normally charged supply reservoir, a normally open restricted charging communication connecting said supply reservoir with said brake pipe, charging control means operable by fluid under pressure to assume a cut-off position for closing said charging communication, means responsive to a slight initial reduction in brake pipe pressure below its normal full charge value to effect a local withdrawal of fluid under pressure from said brake pipe for quick service reduction in brake pipe pressure and supply of such withdrawn fluid under pressure to said charging control means to cause same to assume said cut-off position, and means responsive to said quick service reduction in brake pipe pressure, when greater than a certain degree, to terminate said local withdrawal and to cause fluid under pressure to be supplied from said supply reservoir to said charging control means for maintaining same in said cut-off position.

2. In a fluid pressure brake apparatus, in combination, a normally charged brake pipe, a normally charged supply reservoir, a normally charged control reservoir, normally open restricted charging communication means connecting the supply and control reservoirs to said brake pipe, charging control means operable by fluid under pressure to assume a cut-off position for closing said charging communication means, means subject opposingly to the pressure of said brake pipe and said auxiliary reservoir and responsive to a slight initial reduction in brake pipe pressure relative to supply reservoir pressure to effect a local withdrawal of fluid under pressure from said brake pipe for quick service reduction in brake pipe pressure and supply of such fluid under pressure to said charging control means to cause same to assume its cut-off position, and means subject opposingly to the pressure of said control reservoir and of said brake pipe and responsive to such quick service reduction in brake pipe pressure, when greater than a certain degree, relative to control reservoir pressure to terminate said local withdrawal and to connect said supply reservoir to said charging control means for maintaining same in its cut-off position.

3. In a fluid pressure brake apparatus, in combination, a normally charged brake pipe, a normally charged supply reservoir, a brake cylinder, a quick service volume chamber independent of said brake cylinder, a communication connected to the brake cylinder, quick service effecting means responsive to an initial reduction in brake pipe pressure to connect the brake pipe to the quick service volume chamber and to said communication for local quick service venting of the brake pipe, means responsive to a certain reduction in brake pipe pressure, greater than said initial reduction, to cut off the brake pipe from said communication, and means normally connecting said communication to the atmosphere and responsive to a reduction in brake pipe pressure, greater than said initial reduction and less than said certain reduction, to cut off said communication from the atmosphere and connect same to said supply reservoir.

4. In a fluid pressure brake apparatus, in combination, a brake cylinder, a normally charged brake pipe, a normally charged supply reservoir, a reservoir supply communication extending between the supply reservoir and the brake pipe, reservoir-charging-control-means biased to maintain said supply communication normally open and operable by fluid under pressure to close same, quick service means responsive to an initial reduction in brake pipe pressure to connect the brake pipe to said reservoir-charging-control-means to effect closure of said reservoir supply communication, interlock means responsive to a certain reduction in brake pipe pressure greater than said initial reduction to close the connection of said brake pipe to said reservoir-charging-control-means and connect the latter to the supply reservoir to cause the reservoir supply communication to be maintained closed during any subsequent increased reductions in brake pipe pressure which may transpire, said interlock means being capable of maintaining said reservoir-charging-control means connected to said supply reservoir during a subsequent increase in brake pipe pressure to a certain value above that corresponding to said certain reduction and less than its normally charged value; and service valve means responsive to reduction in brake pipe pressure below its normally charged value to effect supply of fluid under pressure from the supply reservoir to the brake cylinder for pressurization thereof, and responsive to subsequent increase in brake pipe pressure to said certain value to connect the brake cylinder to the atmosphere until brake cylinder pressure equalizes therewith.

5. In a fluid pressure brake apparatus, in combination, a brake cylinder, a normally charged brake pipe, a normally charged supply reservoir, a normally charged control reservoir, a slow-charging communication extending between the supply reservoir and the brake pipe, reservoir-charging-control-means biased to maintain said slow-charging communication normally open, and having a control chamber to the pressurization of which said reservoir-charging-control-means is responsive to close said slow-charging communication; a quick-service passageway, quick-service means subject opposingly to pressures of the brake pipe and supply reservoir, said quick-service means being responsive to a slight reduction in brake pipe pressure relative to supply reservoir pressure to connect the brake pipe to said quick-service passageway, and being responsive to subsequent substantial equalization of brake pipe and supply reservoir pressures to assume a cut-off position for closing the brake pipe to the quick-service passageway, interlock means subject to control reservoir pressure in opposition to a spring bias and to the pressures of the brake pipe and of said quick-service passageway, said interlock means being held in a normal position by its spring bias for connection of the quick-service passageway to the brake cylinder passageway and to the control chamber in the reservoir-charging-control-means, said interlock means being operable by control reservoir pressure upon a certain reduction in brake pipe pressure, greater than the quick-service-means-responsive-reduction, to assume a quick-service cut-off position for closing off the quick-service passageway from the brake cylinder passageway and for transferring connection of the control chamber in the reservoir-charging-control-means from the quick-service passageway to the supply reservoir, said interlock means being responsive during a brake release to a subsequent increase in brake pipe pressure to a certain value, greater than that corresponding to said certain reduction and less than that corresponding to normal charge value, to assume an intermediate position to connect the quick-service passageway to the brake cylinder while the control chamber in the charging valve control means remains connected to the supply reservoir, said interlock means thereupon losing assist from the pressure of fluid in the quick-service passageway which releases via the brake cylinder passageway, and said interlock means thereafter being responsive to a greater increase in brake pipe pressure to return to its normal position; flow restriction means interposed between said interlock means and said brake cylinder passageway; and service valve means subject to pressure of the control reservoir in opposition to pressures of the brake cylinder and of the brake pipe and being normally in a brake release position while the brake pipe is normally charged, said service valve means being responsive to a reduction in brake pipe pressure, greater than a quick-service-means-responsive-reduction, to effect supply of fluid under pressure from the supply reservoir to the brake cylinder, and being operative to effect reduction in brake cylinder pressure to that of the atmosphere upon a subsequent increase in brake pipe pressure to a value less than that at which the interlock means will return from its intermediate position to its normal position.

6. The combination as set forth in claim 5 further including a fast charging communication extending between the supply reservoir and the brake pipe; and means interposed in said fast charging communication to prevent flow of fluid under pressure thereby from the supply reservoir to the brake pipe and to permit flow of fluid under pressure thereby in the reverse direction while so limiting such flow that the supply reservoir pressure cannot thereby become increased above a value necessary to assure return of the quick service means to its cut-off position prior to the interlock means moving from its quick service cut-off position to its intermediate position responsively to increase in brake pipe pressure during brake release.

7. In a fluid pressure brake apparatus, in combination, a brake pipe, a brake cylinder, a supply reservoir, a control reservoir, a supply reservoir charging communication connected to said supply reservoir, a pair of exhaust communications connected to the atmosphere, and a service valve device having a control reservoir pressure chamber connected to said control reservoir, a brake pipe pressure chamber connected to said charging communication, and a brake cylinder pressure chamber connected normally to said brake cylinder, said device comprising valve means for controlling communication between said brake cylinder and said exhaust communications and between said brake pipe and said charging communication, a diaphragm stack operatively connected to said valve means and subject to pressure of fluid in said control reservoir pressure chamber in opposition to pressure of fluid in the brake pipe and brake cylinder pressure chambers, and spring-biased stop means urged toward a stop position and movable therefrom against yieldable opposition, said diaphragm stack during brake release being responsive to an increase in brake pipe pressure as realized in its brake pipe pressure chamber to move into engagement with said spring biased stop means and actuate said valve means to open said brake cylinder to both of said exhaust communications for release of fluid under pressure from the former via the latter while the said charging communication is maintained open to said brake pipe, said diaphragm stack thereafter responding to preponderance in forces resultant from pressures of fluid in its brake pipe and brake cylinder pressure chambers over the force resultant from pressure of fluid in its control reservoir pressure chamber to move said spring-biased stop means out of its stop position and actuate said valve means to close said brake cylinder to one of said exhaust communications while said brake cylinder remains open to the other exhaust communication and said charging communication remains open to said brake pipe, said diaphragm stack thereafter responding to increase in degree of said preponderance in forces to further move said valve means in opposition to said spring-biased stop means to sufficiently close said charging communication to said brake pipe as will so regulate pressure build-up in its brake pipe pressure chamber that a balance of forces on said diaphragm stack will be maintained as fluid under pressure flows from said charging communication to said supply reservoir and fluid under pressure releases from said brake cylinder device via one of said exhaust communications at the exclusion of the other.

8. A fluid pressure brake apparatus comprising, in combination, a brake pipe, a brake cylinder, a supply reservoir, a control reservoir, a plurality of restricted exhaust communications connected to the atmosphere, and service valve means subject to pressure of fluid in said control reservoir in opposition to pressures of fluid in said brake pipe and brake cylinder and responsive to a reduction in brake pipe pressure below control reservoir pressure to connect said supply reservoir to said brake cylinder for supply of fluid under pressure from the former to the latter and reponsive to a subsequent increase in brake pipe pressure at a rate not exceeding a predetermined rate to connect said brake cylinder to all of said exhaust communications for releasing fluid under pressure from said brake cylinder at one rate and responsive to an increase in brake pipe pressure in excess of said predetermined rate to connect said brake cylinder to at least one but less than all of said exhaust communications for releasing fluid under pressure from said brake cylinder at a rate slower than said one rate.

9. The combination according to claim 8, including a one-way-flow charging communication through which fluid under pressure may flow only from said brake pipe to said supply reservoir for charging the latter, and wherein said service valve means normally permits such flow through said charging communication and responds to an increase in brake pipe pressure in excess of said predetermined rate to close said charging communication.

10. In a fluid pressure brake apparatus, in combination, a brake pipe, a brake cylinder, a supply reservoir, a control reservoir, a one-way-flow charging communication through which fluid under pressure may flow only from said brake pipe to said supply reservoir, a plurality of restricted exhaust communications connected to the atmosphere, and service valve means subject to pressure of fluid in said control reservoir in opposition to the pressures of fluid in said brake pipe and brake cylinder and responsive to a reduction in brake pipe pressure relative to control reservoir pressure to supply fluid under pressure from said supply reservoir to said brake cylinder and responsive to a subsequent increase in brake pipe pressure to connect said brake cylinder to all of said exhaust communications for release of fluid under pressure from the former via the latter at one restricted rate, and thereafter said service valve means responding to an excessive rate of increase in brake pipe pressure relative to said one rate of release of brake cylinder pressure to close said brake cylinder to certain but less than all of said exhaust communications for causing release of brake cylinder pressure at a rate more restricted than said one rate and to also reduce the degree of opening of said supply reservoir charging communication to an extent corresponding to said more restricted rate of release of brake cylinder pressure.

References Cited in the file of this patent

UNITED STATES PATENTS

| 2,071,741 | Gnavi | Feb. 23, 1937 |
| 2,661,248 | Keller | Dec. 1, 1953 |